US012122151B2

(12) United States Patent
Yoshino et al.

(10) Patent No.: US 12,122,151 B2
(45) Date of Patent: Oct. 22, 2024

(54) RECORDING DEVICE

(71) Applicant: SEIKO EPSON CORPORATION, Tokyo (JP)

(72) Inventors: Satoshi Yoshino, Matsumoto (JP); Kazuo Saito, Shiojiri (JP); Kensuke Tamai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/328,079

(22) Filed: May 24, 2021

(65) Prior Publication Data

US 2021/0362517 A1 Nov. 25, 2021

(30) Foreign Application Priority Data

May 25, 2020 (JP) ................................ 2020-090701

(51) Int. Cl.

| | |
|---|---|
| ***B41J 11/00*** | (2006.01) |
| ***B41J 11/04*** | (2006.01) |
| ***B41J 11/08*** | (2006.01) |
| ***B41J 13/00*** | (2006.01) |
| ***B41J 13/02*** | (2006.01) |

(Continued)

(52) U.S. Cl.

CPC ........... *B41J 13/03* (2013.01); *B41J 11/0045* (2013.01); *B41J 11/04* (2013.01); *B41J 11/08* (2013.01); *B41J 13/0018* (2013.01); *B41J 13/0036* (2013.01); *B41J 13/025* (2013.01); *B41J 13/076* (2013.01)

(58) Field of Classification Search

CPC .... B41J 11/0045; B41J 11/08; B41J 13/0018; B41J 13/0036; B41J 13/025; B41J 13/03; B41J 13/076

See application file for complete search history.

(56) References Cited

U.S. PATENT DOCUMENTS

| | | | |
|---|---|---|---|
| 6,712,463 | B2 | 3/2004 | Matsumoto |
| 2003/0048345 | A1 | 3/2003 | Matsumoto |

(Continued)

FOREIGN PATENT DOCUMENTS

| | | | |
|---|---|---|---|
| JP | 2003176071 | A | 6/2003 |
| JP | 2004154945 | A | 6/2004 |
| JP | 2016-160025 | A | 9/2016 |

*Primary Examiner* — Justin Seo
*Assistant Examiner* — Kendrick X Liu
(74) *Attorney, Agent, or Firm* — WORKMAN NYDEGGER

(57) ABSTRACT

A recording device includes a transport unit, a medium supporting member, and a recording head. The transport unit includes transport roller pairs and discharge roller pairs. The discharge roller pair includes a discharge driving roller and discharge driven rollers provided downstream of the medium supporting member in a transport direction. The transport unit includes a first roller and a second roller, which are an example of a guide roller provided downstream of the medium supporting member in the transport direction and on the same upper side as the discharge driven roller with respect to a transport path of a medium. The first roller and the second roller are provided on either side of the discharge roller pair in the transport direction, and a lower end of at least one of the first roller and the second roller is positioned lower than an upper end of the discharge driving roller.

8 Claims, 19 Drawing Sheets

(51) Int. Cl.
*B41J 13/03* (2006.01)
*B41J 13/076* (2006.01)

(56) References Cited

U.S. PATENT DOCUMENTS

| | | | | |
|---|---|---|---|---|
| 2003/0210315 | A1* | 11/2003 | Uwagaki | B41J 13/14<br>271/264 |
| 2006/0077245 | A1* | 4/2006 | Tsutsui | B41J 13/14<br>347/104 |
| 2008/0205954 | A1* | 8/2008 | Sugiyama | B41J 13/009<br>399/401 |
| 2009/0087239 | A1* | 4/2009 | Uchino | B41J 3/60<br>399/401 |
| 2013/0257948 | A1* | 10/2013 | Terada | B41J 25/308<br>347/14 |
| 2017/0282609 | A1* | 10/2017 | Yatsunami | B65H 5/062 |

* cited by examiner

RECORDING DEVICE

The present application is based on, and claims priority from JP Application Serial Number 2020-090701, filed May 25, 2020, the disclosure of which is hereby incorporated by reference herein in its entirety.

BACKGROUND

1. Technical Field

The present disclosure relates to a recording device provided with a transport unit that transports a medium, a medium supporting member that supports the medium, and a recording head that performs recording on the medium supported by the medium supporting member.

2. Related Art

For example, JP-A-2016-160025 discloses a recording device provided with a transport unit that transports a medium in a transport direction along a transport path, a recording unit including a recording head that records an image on a medium being transported, and a medium supporting member that supports the medium at a position facing the recording unit in the transport path.

The recording device includes a transport roller pair disposed upstream of the recording unit in the transport direction, and a downstream wave-shaping mechanism disposed downstream of the recording unit in the transport direction. A downstream wave-shaping mechanism transports the medium in the transport direction and imparts a wave-like shape along a width direction to the medium on the medium supporting member. The downstream wave-shaping mechanism is provided with a discharge roller pair configured by a plurality of discharge rollers that clamp the medium and a plurality of spurs, and with a plurality of second spurs. The plurality of second spurs are in contact with the top surface of the medium transported by the discharge roller pair. As a result of the medium supporting member moving from a first position to a second position in resistance to an urging force of a first urging member, a wave shape is imparted in accordance with the rigidity of the medium.

However, in the recording device described in JP-A-2016-160025, when a rear end of the medium exits from a nip position of a transport roller pair, the rear end of the medium is kicked out by the transport roller pair. There is a problem in that a transport position accuracy of the medium is reduced due to this flipping up of the medium. For example, a reduction in the transport position accuracy of the medium leads to a deterioration in a recording position at which the recording is performed on the medium, which causes a deterioration in recording quality.

SUMMARY

A recording device for solving the above-described problem is a recording device including a transport unit that transports a medium along a horizontal direction in a transport direction, a medium supporting member that includes a supporting surface supporting the medium, and a recording head that performs recording on the medium at a position facing the medium supporting member. The transport unit includes a transport roller pair formed of a transport driving roller and a transport driven roller provided upstream of the medium supporting member in the transport direction, a discharge roller pair formed by a discharge driving roller and a discharge driven roller provided downstream of the medium supporting member in the transport direction, and a guide roller provided downstream of the medium supporting member in the transport direction, and on the same upper side as the discharge driven roller with respect to a transport path of the medium, and driven to rotate by contact with the medium during transport. The guide roller is provided on both sides of the driven discharge roller in the transport direction or on both sides of the discharge roller pair in a width direction intersecting the transport direction, and a lower end of at least one of the guide rollers on the both sides of the discharge roller pair in the transport direction is positioned lower than an upper end of the discharge driving roller.

DESCRIPTION OF EXEMPLARY EMBODIMENTS

Figure 1:
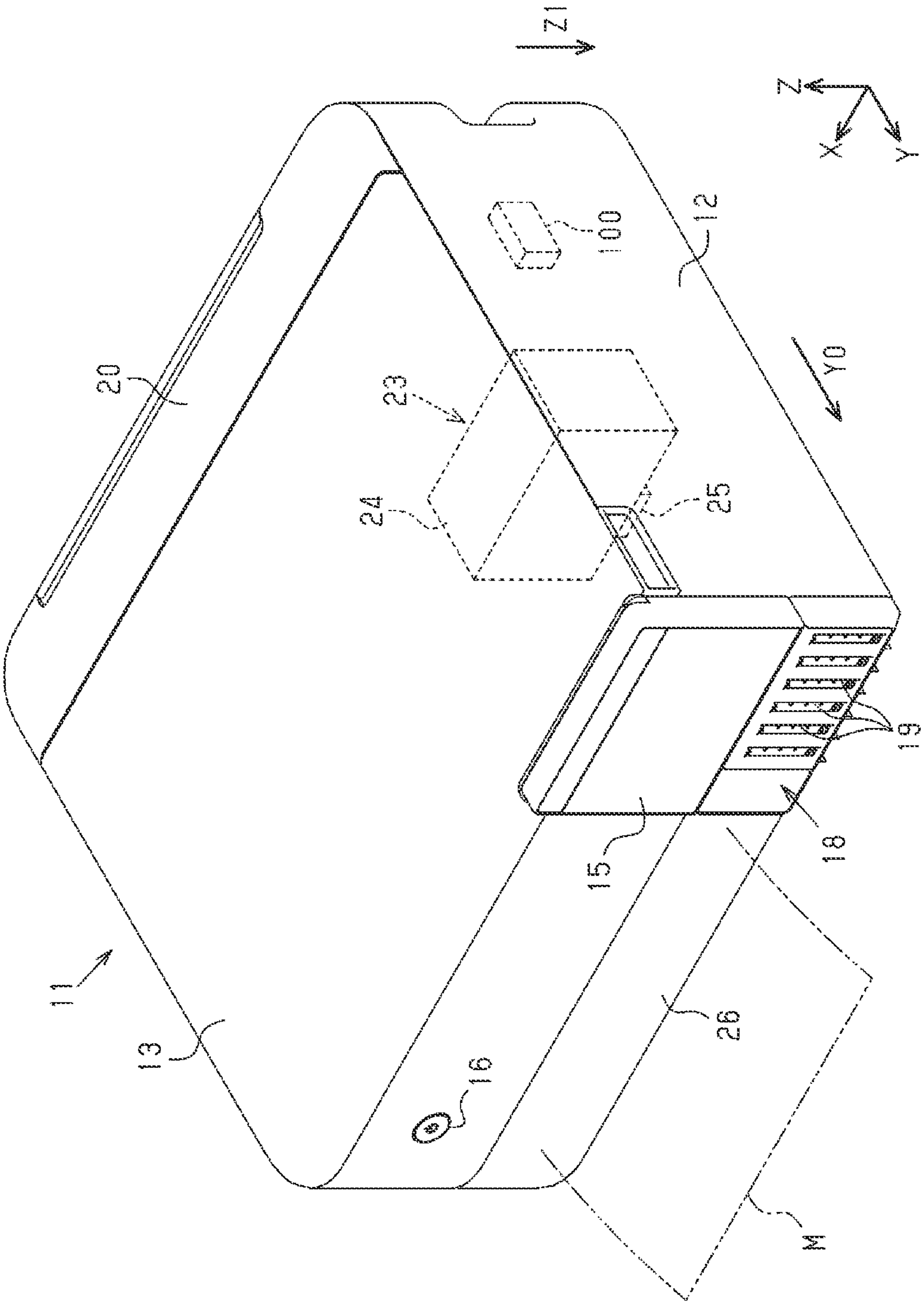
FIG. 1 is a perspective view of a recording device according to an embodiment.

An embodiment will be described below with reference to the accompanying figures. In FIG. 1, three virtual axes orthogonal to each other are an X-axis, a Y-axis, and a Z-axis, assuming that a recording device 11 is placed on a horizontal surface. The X-axis is a virtual axis parallel to a scanning direction of a recording head to be described below, and the Y-axis is a virtual axis parallel to a transport direction of a medium at a time of recording. A direction in which the recording head reciprocates in both directions parallel to the X-axis is referred to as a scanning direction X. Further, the Z-axis is a virtual axis parallel to a vertical direction Z1. One direction parallel to the Y-axis refers to the transport direction of the medium in a recording position at which the recording head performs recording on the medium. This direction is also referred to as a transport direction Y. The transport direction of the medium when a recording head 25 performs the recording on the medium is referred to as a first transport direction Y1, and a direction opposite to the first transport direction Y1 is referred to as a second transport direction Y2. Further, the transport direction in which a medium M is transported is not parallel to the Y-axis over an entire transport path of the medium M, and a transport direction Y0 changes in accordance with the position of the medium M on the transport path. Further, a direction intersecting the transport direction Y0 in which the medium is transported is also referred to as a width direction X. In the embodiment, the width direction X and the scanning direction X are the same direction.

Configuration of Recording Device

The recording device 11 illustrated in FIG. 1 is a serial recording type inkjet printer. As illustrated in FIG. 1, the recording device 11 is provided with a device main body 12, and a cover 13 provided on an upper portion of the device main body 12 so as to be openable and closable. The recording device 11 has an overall substantially rectangular cuboid shape.

An operating panel 15 is provided on the front surface of the recording device 11. The operating panel 15 includes an operation unit (not illustrated) including an operation button or the like that is operated when issuing various types of command to the recording device 11, and a display unit (not illustrated) that displays various menus and an operating status or the like of the recording device 11. Further, a power button 16 is provided on the front surface of the device main body 12. Note that the display unit may be configured by a touch panel, and the operation unit may be configured by an operation function of the touch panel.

Further, a housing unit 18 that houses at least one (six in the embodiment) liquid supply source 17 (see FIG. 2) is provided on the front right side of the device main body 12. The housing unit 18 includes at least one (six in the present embodiment) window 19 corresponding to each of the liquid supply sources 17. The window 19 is made of a transparent or translucent resin, and a user can visually ascertain a liquid level of the liquid contained in the liquid supply source 17 from outside, through the window 19.

Further, a feed cover 20 is provided on the rear upper side of the recording device 11 so as to be openable and closeable. The feed cover 20 is opened and closed by rotating about the rear end thereof. In the device main body 12, a feed unit 21 is housed inside the feed cover 20 in a closed position illustrated in FIG. 1. The feed unit 21 feeds the medium M, such as a sheet. The feed unit 21 includes a feed tray 22 (see FIG. 2) on which the medium M is placed. The user places the medium M on the feed tray 22 (see FIG. 2) that is exposed when the feed cover 20 is in a open position.

As illustrated in FIG. 1, the recording device 11 is provided with a recording unit 23 that performs recording on the transported medium M. The recording unit 23 is provided with a recording head 25 that performs the recording on the medium M. The recording unit 23 of a present example is, for example, a serial recording type unit. The recording unit 23 of the serial recording type is provided with a carriage 24 that can reciprocate in the scanning direction X, and the recording head 25 that is held by a lower portion of the carriage 24. A surface of the recording head 25 that faces the medium M transported along the transport path is a nozzle surface (see FIG. 6) in which a plurality of nozzles (not illustrated) open. The liquid supply source 17 and the recording unit 23 are coupled by a liquid supply tube (not illustrated), and liquid is supplied from the liquid supply source 17 to the recording head 25 through the liquid supply tube. The recording head 25 discharges the liquid from the plurality of nozzles toward the medium M while moving together with the carriage 24.

Further, a discharge cover 26 is provided on the lower portion of the front surface of the recording device 11 so as to be openable and closeable. The discharge cover 26 rotates about the lower end thereof. In the device main body 12, a stacker 27 (see FIG. 4) used to receive the recorded medium M is housed in the device main body 12 to the inside of the discharge cover 26 in the closed position illustrated in FIG. 1. In a state in which the discharge cover 26 is opened in an open position, the stacker 27 can be slid in the transport direction Y and extended to a receiving position for receiving the medium M.

The recording device 11 is provided with a control unit 100 that performs various controls. The control unit 100 performs control of the carriage 24 and the recording head 25, transport control of the medium M, display control of the operating panel 15, power control, and the like.

Figure 2:
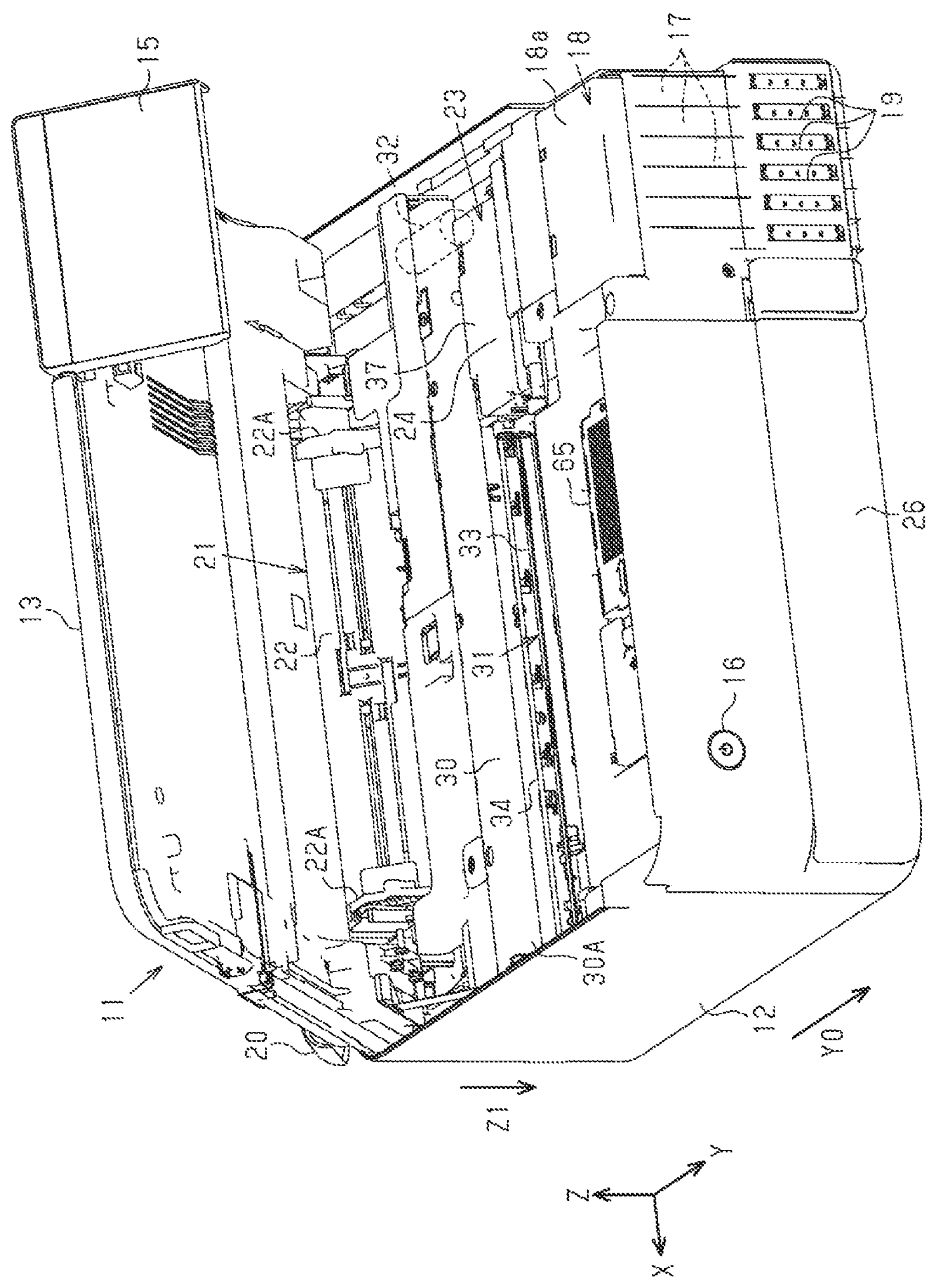
FIG. 2 is a perspective view illustrating the recording device when a cover is open.

Next, a detailed configuration of the recording device 11 will be described with reference to FIG. 2 and FIG. 3. As illustrated in FIG. 2, a main frame 30 extends in the width direction X inside the device main body 12. The main frame 30 includes a pair of guide rails 30A (see also FIG. 3) that guide the carriage 24. The pair of guide rails 30A extend in parallel to each other along the scanning direction X. The carriage 24 is movably supported in the scanning direction (the width direction X) at two locations in the vertical direction Z1 by the pair of guide rails 30A. The carriage 24 reciprocates in the scanning direction X as a result of being guided by the pair of guide rails 30A. A movement mechanism 31 (see FIG. 2) that moves the carriage 24 in the scanning direction X is provided between the main frame 30 and the carriage 24. The movement mechanism 31 is a belt drive mechanism, for example, and is provided with a carriage motor 32, which is a drive source of the carriage 24, and an endless timing belt 33 that is stretched along the scanning direction X. The carriage 24 is fixed to a portion of the timing belt 33. The carriage 24 reciprocates in the scanning direction X via the timing belt 33 as a result of forward and reverse rotation of the carriage motor 32.

Further, the main frame 30 is provided with a linear encoder 34 extending along the scanning direction X. The linear encoder 34 is provided with a linear scale extending along the scanning direction and a sensor (not illustrated) attached to the carriage 24. The sensor detects the linear scale and outputs a pulse signal that includes a number of pulses proportional to a movement amount of the carriage 24.

A supply cover 18*a* that opens and closes a top portion of the housing unit 18 is provided on the housing part 18. When the user sees through the window 19 that there is the liquid supply source 17 with a small remaining amount, the user opens the cover 13 and the supply cover 18*a*, and injects the liquid from a liquid bottle into an inlet (not illustrated) of the liquid supply source 17.

Figure 3:
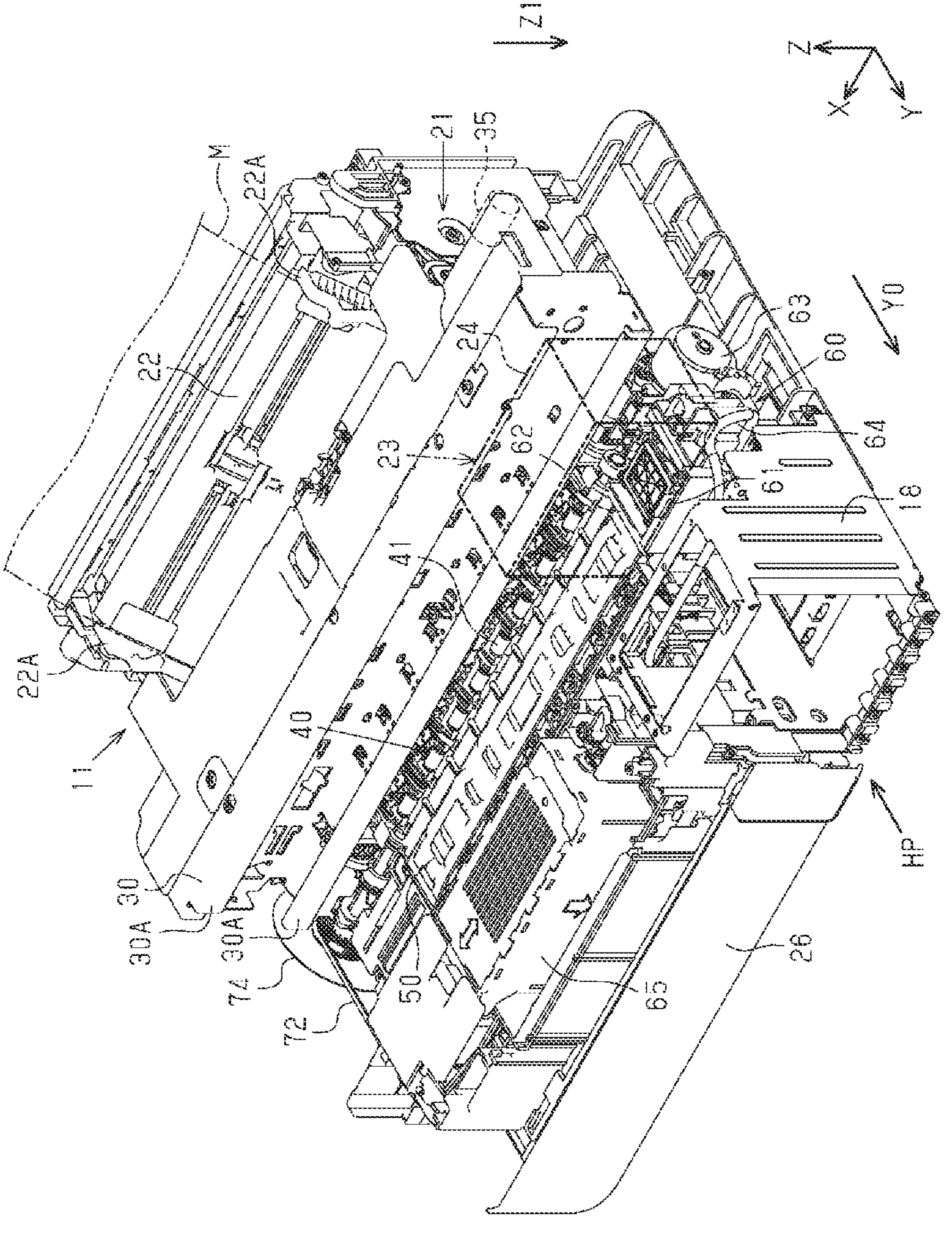
FIG. 3 is a perspective view illustrating the recording device when a housing is removed.

As illustrated in FIG. 3, a pair of edge guides 22A are provided on the feed tray 22 on which the medium M is placed. The medium M placed on the feed tray 22 is positioned in the width direction X by being sandwiched between the pair of edge guides 22A. The feed unit 21 is provided with a feed motor 35 as a drive source. The feed unit 21 feeds the medium M placed on the feed tray 22 in the transport direction Y0 along the transport path.

As illustrated in FIG. 3, the recording device 11 is provided with a transport unit 40 that transports the medium M fed from the feed unit 21 in the transport direction Y0. Further, the recording device 11 is provided with a medium supporting member 50 that supports the medium M. The medium supporting member 50 is a long member extending in the width direction X, and has a length capable of supporting the entire width direction of the medium M having a maximum width. The recording unit 23 performs the recording on a portion of the transported medium M supported by the medium supporting member 50.

The recording device 11 records characters or an image on the medium M by alternately repeating a recording operation in which the carriage 24 moves once and the recording head 25 performs recording for one pass, and a transport operation in which the medium M is transported to the next recording position. Here, as long as the transport position accuracy with which the transport unit 40 transports the medium and stops the medium at the next recording position is high, a high recording quality is secured. Note that the recording unit 23 may be a line recording type recording unit. The recording unit 23 of the line recording type is provided with the recording head 25 configured by a line head having a plurality of nozzles capable of discharging the liquid across the entire width of the medium M having the maximum width. Since the nozzles of the recording head 25 configured by the line head discharge the liquid across the entire width of the medium M onto the medium M that is transported at a constant velocity, high-velocity recording, such as of an image, is realized.

The recording device 11 is provided with a gap adjustment mechanism 37 that adjusts a gap between the recording unit 23 and the medium supporting member 50. The gap adjustment mechanism 37 is a mechanism for adjusting the gap by changing a height position of the recording head 25. The control unit 100 controls the gap adjustment mechanism 37 and adjusts the gap to a value corresponding to the type of the medium M. When the medium M is the sheet, for example, the type of the medium M may be normal paper (thin paper, cardboard), photographic paper, an envelope, a CD-recordable disk (CDR), or the like. Note that the medium M that is the normal paper or the like is a first medium having a low rigidity, and the medium M that is the photographic paper or the like is a second medium having a rigidity greater than that of the first medium.

The carriage 24 illustrated by a two-dot chain line in FIG. 3 is positioned in a home position HP, which is a standby position when the recording is not performed. A maintenance device 60 that performs maintenance of the recording head 25 is disposed in a position adjacent to the medium supporting member 50 in the width direction X, in a lower position facing the carriage 24 in the home position HP. The maintenance device 60 is provided with a cap 61 for capping the recording head 25 when the carriage 24 is in the home position HP, and a wiper 62 for wiping the nozzle surface 25A (see FIG. 6) of the recording head 25. When the recording head 25 is capped by the cap 61, thickening or drying of the liquid, such as ink, in the nozzles of the recording head 25 is suppressed. When the liquid in the nozzle thickens, when air bubbles form in the liquid inside the nozzle, or when the nozzle is blocked by foreign material such as paper powder, a discharge failure occurs in which the liquid cannot be discharged normally from the nozzle due to clogging of the nozzle.

The maintenance device 60 cleans nozzles of the recording head 25 to eliminate or prevent this type of discharge failure. The maintenance device 60 is provided with a suction pump 63 that is communicated with the cap 61 through a tube (not illustrated). The maintenance device 60 drives the suction pump 63 under a capping condition in which the cap 61 is in contact with the nozzle surface 25A of the recording head 25 in a state of surrounding the nozzle. When the suction pump 63 is driven, negative pressure is introduced into a closed space formed in a state of communication with the nozzles between the nozzle surface 25A and the cap 61, thereby forcibly suctioning and discharging the liquid from the nozzles. By forcibly suctioning and discharging the thickened liquid, the air bubbles, or the foreign matter such as the paper powder from the nozzle, the nozzle recovers from the discharge failure.

Further, the recording unit moves to the home position HP at a regular or irregular timing during the recording operation in which the recording is performed on the medium M, and performs empty discharge (flushing) of droplets that are not related to the recording from all of the nozzles toward the cap 61, thus preventing the discharge failure during recording. The liquid (waste liquid) discharged from the nozzles by the cleaning and the empty discharge is pumped through a waste liquid tube 64 to a waste liquid tank 65 by driving the suction pump 63.

Figure 4:
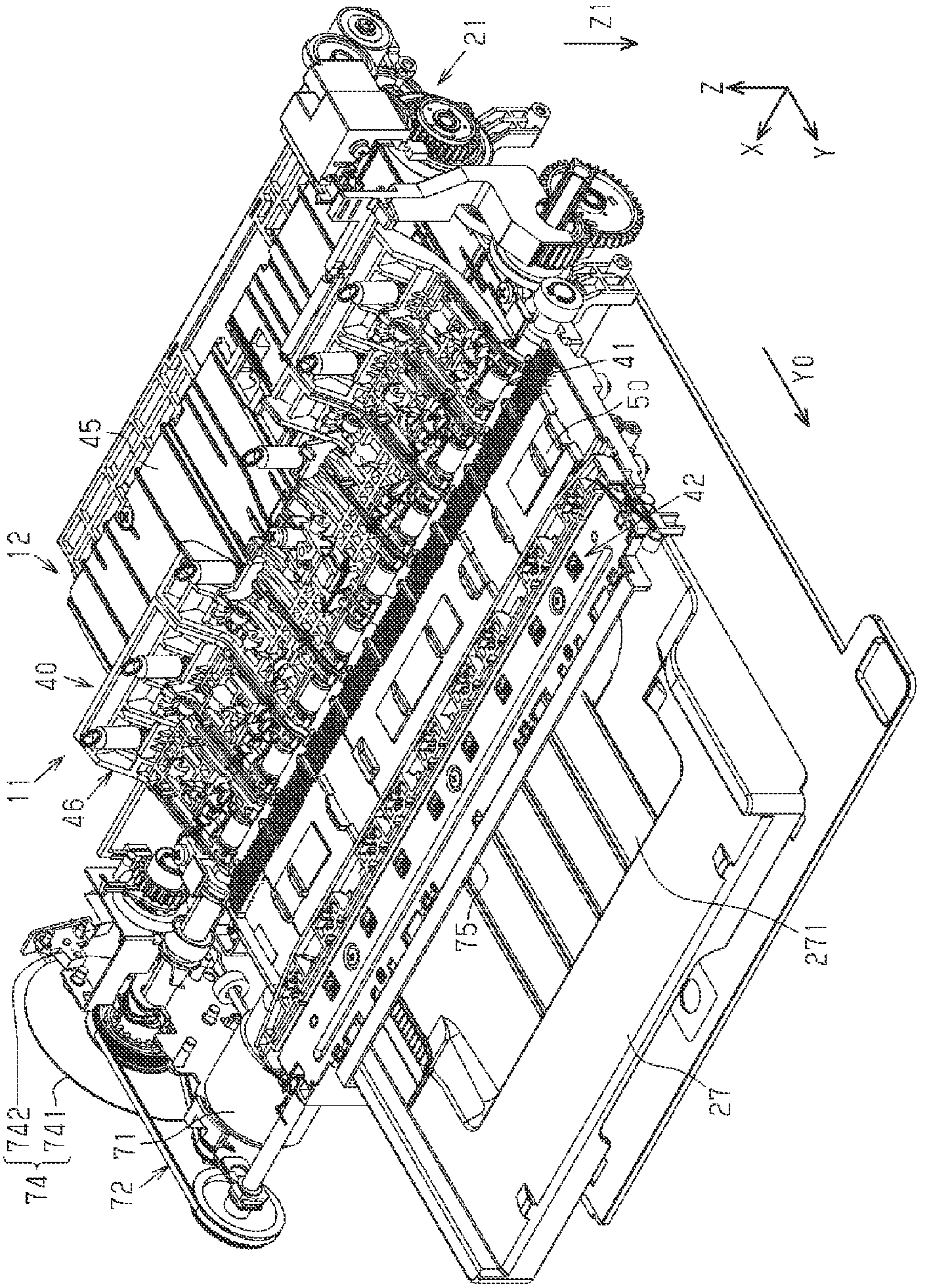
FIG. 4 is a perspective view illustrating a portion of the recording device when the housing is removed.
Figure 5:
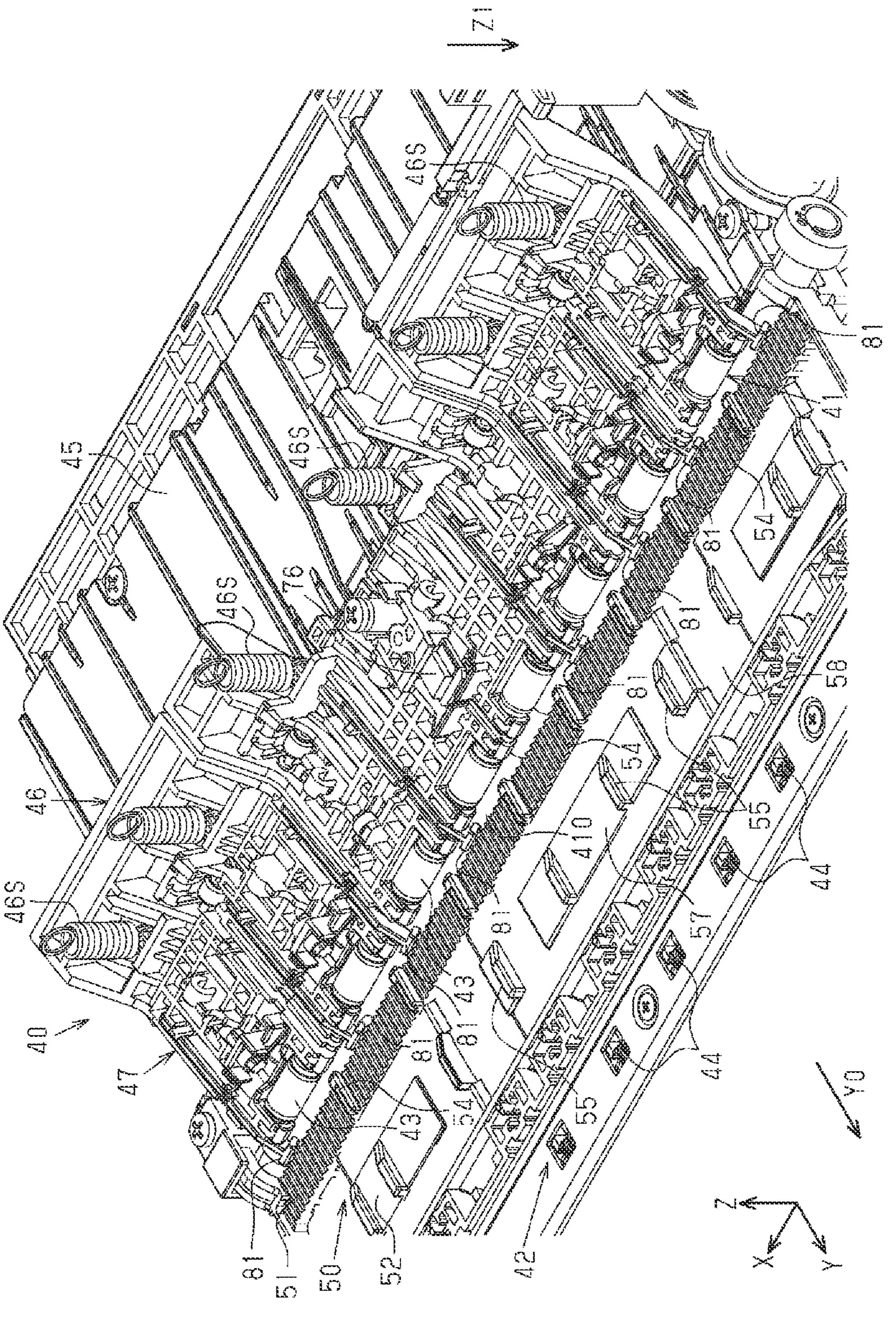
FIG. 5 is a perspective view illustrating a portion of a transport unit.
Figure 6:
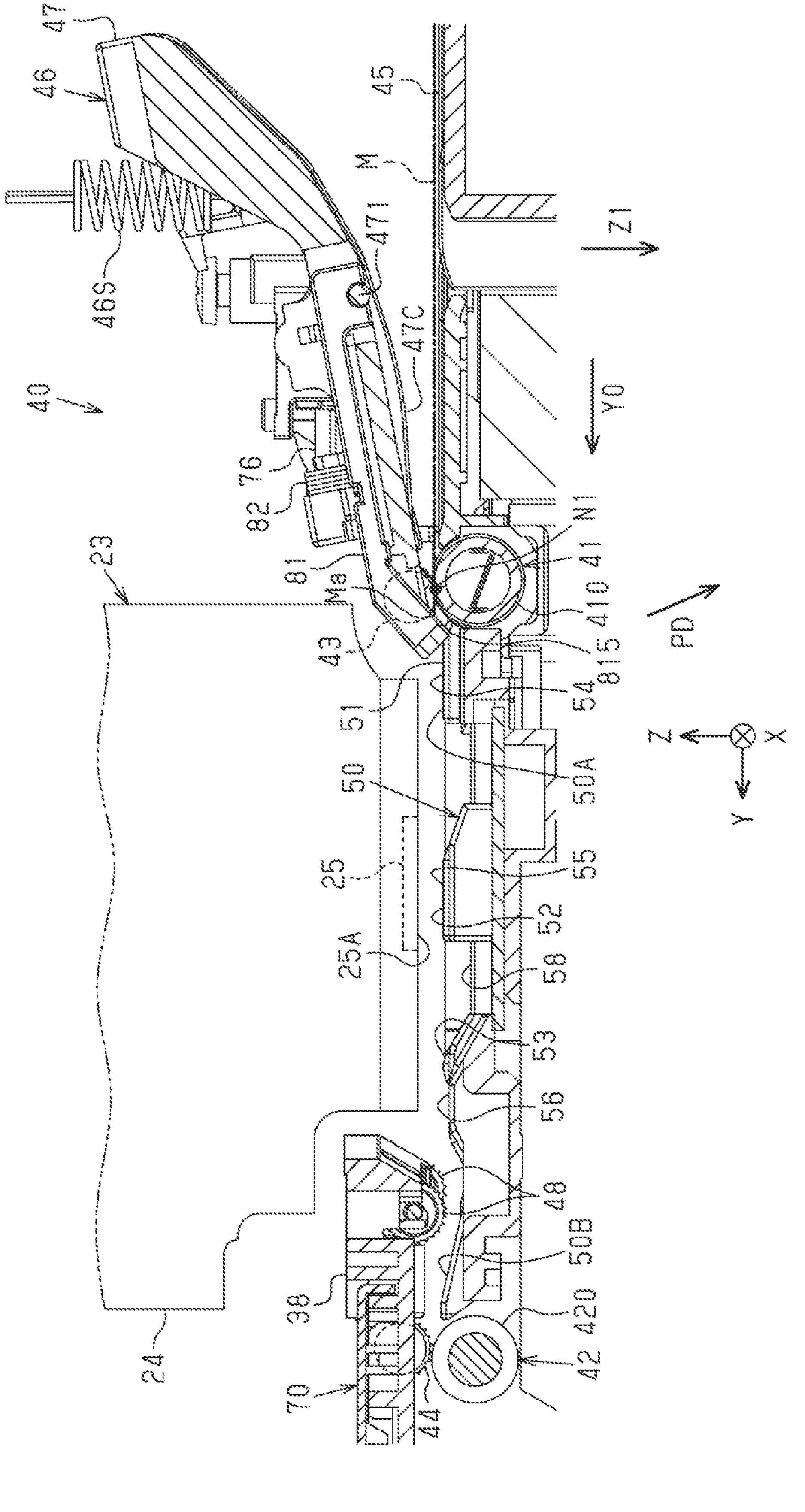
FIG. 6 is a side cross-sectional view illustrating a portion of the transport unit and a recording unit.

As illustrated in FIG. 4 to FIG. 6, the transport unit 40 is provided with transport roller pairs 41 disposed at upstream positions, of both of sides sandwiching the medium supporting member 50 in the transport direction Y0, and discharge roller pairs 42 disposed at downstream positions. As illustrated in FIG. 5 and FIG. 6, each of the transport roller pairs 41 is configured by a pair of a transport driving roller 410 and transport driven rollers 43. Specifically, each of the transport roller pairs 41 is configured by the one transport driving roller 410 and a plurality of the transport driven rollers 43 that abut the transport driving roller 410. Each of the discharge roller pairs 42 is formed of a pair configured by a discharge driving roller 420 (see FIG. 6) and a plurality of discharge driven rollers 44. The discharge driven roller 44 is, for example, a star wheel including a plurality of teeth along the outer circumference thereof.

As illustrated in FIG. 4 and FIG. 5, the transport unit 40 is provided with a plate-shaped medium guide member 45 that supports the back surface of the fed medium M, and a medium guide mechanism 46 that is disposed above the medium guide member 45 with the transport path of the medium M interposed therebetween. As illustrated in FIG. 5, the medium guide mechanism 46 includes a rotatable guide member 47 that guides the medium M along the transport path, the plurality of transport driven rollers 43 supported on the downstream end of the guide member 47 in the transport direction Y0, and an urging member 46S that urges the guide member 47 in a direction in which the transport driven rollers 43 approach the transport driving roller 410.

As illustrated in FIG. 4, the recording device 11 is provided with a transport motor 71, which is a drive source of the transport unit 40, and a power transmission mechanism 72 that transmits the power of the transport motor 71 to the drive rollers 410 and 420 (see FIG. 6). The power transmission mechanism 72 includes a gear train that transmits the power of the transport motor 71 to the transport driving roller 410, a timing belt that transmits the rotation of the transport driving roller 410 to the discharge driving roller 420, and the like. A rotary encoder 74 that detects the rotation of the transport driving roller 410 is provided in the recording device 11. The rotary encoder 74 is provided with a rotating scale 741 fixed to an end portion of a rotation axis of the transport driving roller 410, and an optical sensor 742 that detects the rotation of the rotating scale 741. The rotary encoder 74 outputs a pulse signal including a number of pulses proportional to a rotation amount of the transport driving roller 410.

As illustrated in FIG. 4, the stacker 27 has a quadrangular plate-shaped mounting portion 271. The stacker 27 moves between a retracted position illustrated in FIG. 4 and a receiving position obtained as a result of the stacker 27 sliding downstream from the retracted position in the transport direction Y0. A discharge port 75 is open above the stacker 27, and the recorded medium M is discharged from the discharge port 75. The recorded medium M discharged from the discharge port 75 is placed on the stacker 27 in the receiving position. The stacker 27 may be powered by the power of an electric motor, or may be caused to slide manually by the user.

The recording device 11 according to the embodiment includes a label recording function for performing recording on a label surface of a disk, such as the CDR and the like. When the disk is the medium M and the label recording is performed that performs the recording on the label surface thereof, the user sets the disk on a plate-shaped dedicated tray (not illustrated), and inserts the dedicated tray from the discharge port 75. The dedicated tray is nipped by the transport roller pair 41 and the discharge roller pair 42. In this way, the disk is transported to the recording position where the recording by the recording unit 23 is possible. The recording unit 23 records an image and the like on the label surface of the disk.

As illustrated in FIG. 5 and FIG. 6, the medium supporting member 50 is provided with a first support unit 51 positioned at an upstream end in the transport direction Y0, a main second support unit 52 positioned downstream of the first support unit 51 in the transport direction Y0, and a third support unit 53 positioned downstream of the second support unit 52 in the transport direction Y0. The first support portion 51 supports a section of the medium M that has just been fed out from the transport roller pair 41. The second support unit 52 is disposed in a region facing a movement region of the recording head 25. The second support unit 52 supports the medium M in a recording region over which the liquid discharged from the nozzles by the recording head 25 lands on the medium M. The first support unit 51 supports the medium M in a region positioned upstream of the recording region in the transport direction Y0. The third support unit 53 supports a section of the medium M on which the recording is finished. The first support unit 51, the second support unit 52, and the third support 53 extend over a region slightly wider, in the width direction X, than a width region over which the medium M having the maximum width is conveyed.

The first support portion 51 is provided with a plurality of first ribs 54 protruding upward while being arranged at intervals in the width direction X. The second support portion 52 includes a plurality of second ribs 55 protruding upward while being arranged at intervals in the width direction X. The third support portion 53 includes a plurality of third ribs 56 projecting upward while being arranged at intervals in the width direction X. The first ribs 54, the second ribs 55, and the third ribs 56 are disposed at the same positions in the width direction X. Therefore, the second ribs 55 are positioned in positions downstream of the first ribs 54 in the transport direction Y0, and the second ribs 55 are positioned in positions upstream of the third ribs 56 in the transport direction Y0. One each of the second ribs 55 is additionally provided on either side, further to the outside than a range over which the first ribs 54 are disposed. Therefore, the number of second ribs 55 is two more than the number of first ribs 54. Note that the position in the width direction X of each of the ribs 54 to 56 is set in accordance with the width size of the medium M so as to be capable of supporting both end portions in the width direction X of the medium M, when supporting the medium M of a prescribed size. Thus, whatever the size of the medium M of the prescribed size, both end portions in the width direction X are supported by the ribs 54 to 56 positioned corresponding to the respective width dimensions.

Figure 7:
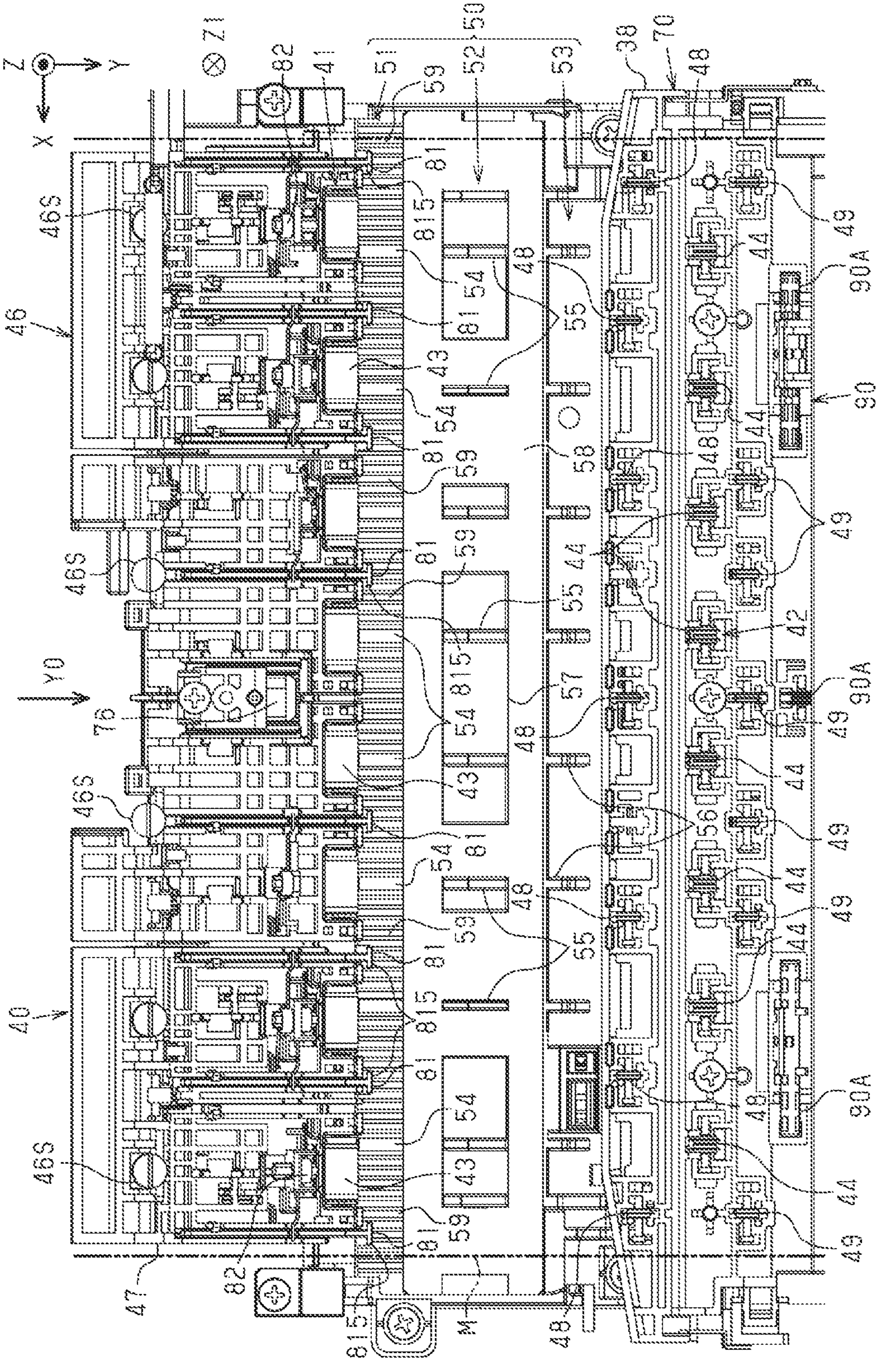
FIG. 7 is a plan view illustrating a portion of the transport unit.

As illustrated in FIG. 5 and FIG. 7, the second support portion 52 is provided with substrate portions 57 on which one or two of the second ribs 55 protrude, and a liquid absorbing body 58 disposed surrounding the substrate portions 57. The liquid absorbing body 58 is formed of a porous synthetic resin material, and absorbs the liquid such as the ink. When the medium M of the prescribed size is supported by the second ribs 55, the liquid absorbing body 58 is disposed in a position corresponding to the width size of the medium M so as to be able to absorb the liquid discharged from the nozzles of the recording head 25 on the outside of both ends in the width direction X of the medium M. For this reason, when the recording device 11 performs borderless recording in which the recording device 11 performs the recording on the medium M of the prescribed size without creating a margin around a peripheral portion of the medium M, the liquid absorbing body 58 is disposed in the position at which the liquid is discharged on the outside of both the ends in the width direction X of the medium M, and the liquid discharged to the outside of the medium M in the width direction X is absorbed by the liquid absorbing body 58. At the time of the borderless recording, the liquid discharged to the outside of the medium M is prevented from adhering to the second ribs 55. As a result, it is possible to avoid a situation in which the liquid adhered to the second ribs 55 is transferred to the back surface of the medium M during transport, thus avoiding contaminating the back surface of the medium M with the liquid.

As illustrated in FIG. 5 and FIG. 7, a medium detector 76 that detects the medium M is attached to a central portion, in the width direction X, of the guide member 47. The medium detector 76 detects the presence or absence of the medium M at a position upstream of the transport roller pair 41 in the transport direction Y0. Note that a lower surface of the guide member 47 that faces the transport path of the medium M is a guide surface 47C (see FIG. 6) that guides the medium M.

As illustrated in FIG. 6 and FIG. 7, first rollers 48, which are driven to rotate when they come into contact with the medium M are provided in positions above the transport path, between a scanning region of the recording unit 23 and the discharge roller pairs 42. The plurality of first rollers 48 are provided in the width direction X. Of the plurality of first rollers 48, the two first rollers 48 positioned outermost in the width direction X are positioned slightly downstream of the other first rollers 48 in the transport direction Y0.

As illustrated in FIG. 5 to FIG. 7, a plurality of pressing members 81 that press the medium M during transport toward the medium supporting member 50 are provided on the medium guide mechanism 46, at a plurality of locations separated in the width direction X. As illustrated in FIG. 6, the pressing member 81 is provided with a contact portion 815 that comes into contact with the surface of the medium M that is an object to be pressed, at a tip end thereof, and a support shaft 471, which is a rotational fulcrum positioned upstream of the contact portion 815 in the transport direction Y0. The pressing member 81 is provided such that a rear end portion thereof is supported in a state in which the support shaft 471 of the guide member 47 configuring the medium guide mechanism 46 is inserted into a hole 814, and the pressing member 81 can rotate over a predetermined angle range about the support shaft 471. The pressing member 81 is provided so as to be movable in a direction intersecting a support surface 50A (see FIG. 10). The pressing member 81 is urged, by an elastic member 83 (see FIG. 9 and FIG. 10) that configures an urging mechanism 82, in a pressing direction in which the contact portion 815 of the tip portion of the pressing member 81 can press the surface of the medium M during transport.

As illustrated in FIG. 6, a pressing direction PD in which the pressing member 81 of the present example presses the medium M is a direction in which the contact portion 815 moves downward about the support shaft 471, and is a direction in which the contact portion 815 can press the medium M against the support surface 50A of the medium supporting member 50. In FIG. 6, the contact portion 815 that is the lower end portion of the pressing member 81 presses the medium M at a nip position N1 of the transport roller pair 41, and at a position lower than the support surface 50A (see FIG. 10). Note that the pressing direction PD may be a direction in which the medium M during transport is pressed against the support surface 50A.

As illustrated in FIG. 6, the contact portion 815 is positioned upstream of the recording head 25 in the transport direction Y0 and within a range that is downstream of the nip position N1 of the transport roller pair 41. In other words, the pressing member 81 presses the surface of the medium M at a position downstream of the nip position N1 of the transport roller pair 41 in the transport direction Y0, and at a section before the recording is performed by the recording head 25. One reason for this is that it is possible to prevent a situation in which, when the contact portion 815 of the pressing member 81 presses a recording surface, which is the surface of the medium M, after the recording, the ink transferred from the recording surface to the contact portion 815 adheres to and contaminates the other medium M. Further, another reason for this is that, when the tip portion of the medium M is positioned below the recording head 25, by causing the medium M to be deformed into a wave-like shape illustrated in FIG. 9 and imparting tension extending in the transport direction Y0 to the tip portion of the medium M, thus increasing the rigidity of the tip portion, it is possible to suppress contact of the medium M with the nozzle surface 25A due to floating of the tip portion of the medium M.

Figure 8:
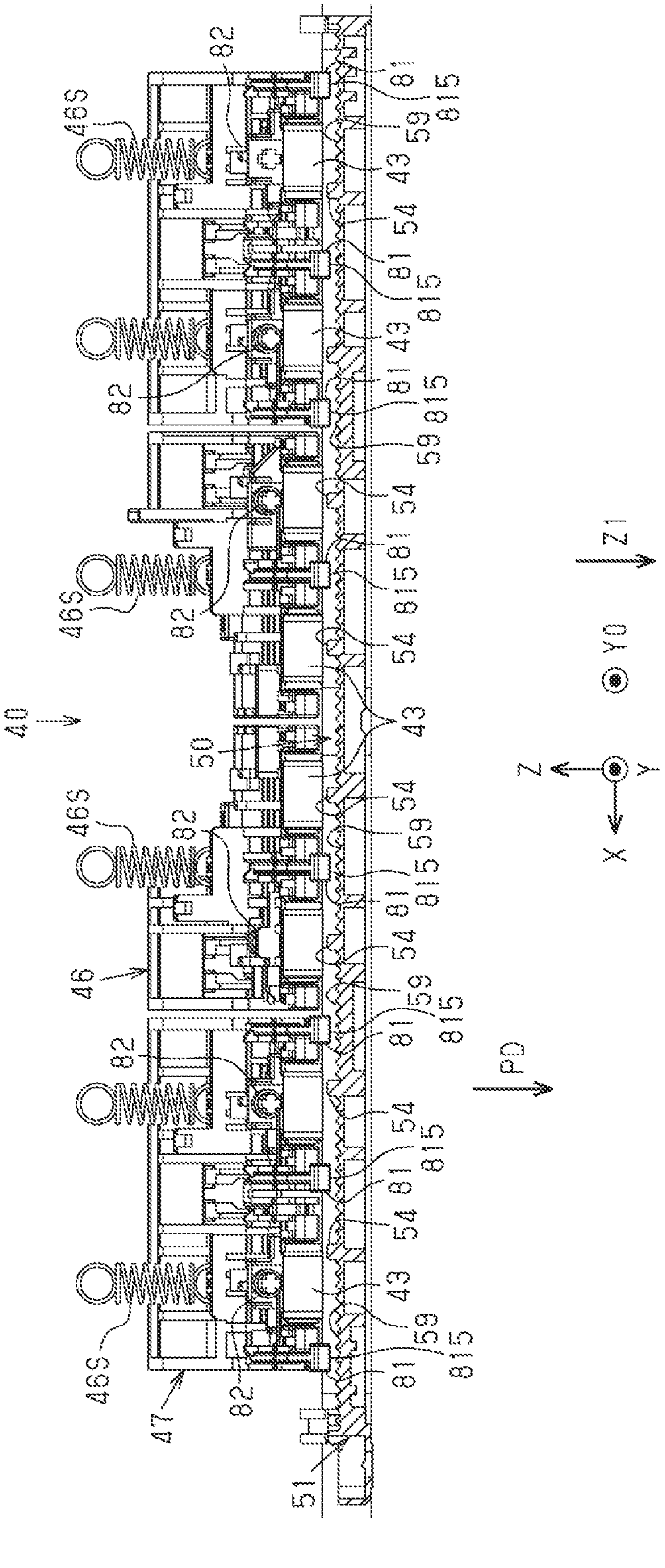
FIG. 8 is a front cross-sectional view illustrating a portion of the transport unit.
Figure 9:
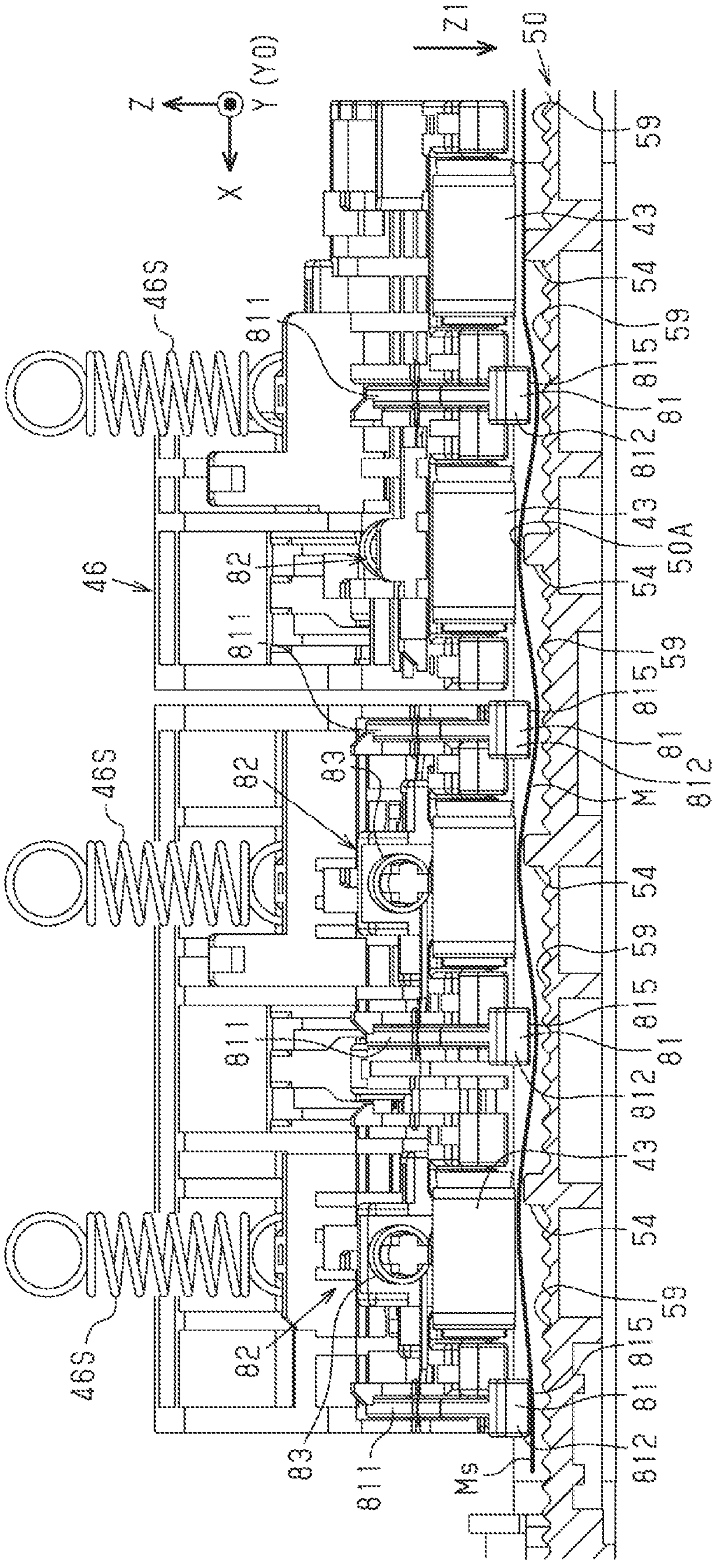
FIG. 9 is a front cross-sectional view illustrating an effect of pressing members.

As illustrated in FIG. 7 and FIG. 8, the pressing members 81 are disposed in positions at which the contact portions 815 face recessed regions 59 between the ribs 54 in the width direction X of the medium supporting member 50. In other words, the pressing members 81 are disposed in the positions at which the contact portions 815 face the recessed regions 59 other than the ribs 54, which are the convex portions of the medium supporting member 50 having a shape of projections and depressions in the width direction X. Thus, in the width direction X, the ribs 54 are positioned between two of the adjacent contact portions 815. The plurality of pressing members 81 press the surface of the medium M at the positions on both sides of the rib 54 sandwiched by the contact portions 815 in the width direction X, thus causing the medium M during transport to curve into the wave-like shape in which ridge portions and valley portions repeatedly alternate in the width direction X, as illustrated in FIG. 9.

Here, a force required to curve the medium M into the wave-like shape is less at sections near side ends in the width direction X that are free ends of the medium M. On the other hand, a central portion separated from the free ends in the width direction X of the medium M is a position at which it is difficult to curve the medium M using the pressing member 81. Further, as illustrated in FIG. 5 and FIG. 7, the medium detector 76 is disposed in a central portion in the width direction X of the guide member 47. The medium detector 76 detects the end portion of the medium M in the transport direction Y0. Since it is difficult to secure a space to dispose other components in the peripheral region of the medium detector 76, the plurality of holding members 81 are disposed in regions excluding a central portion in the width direction X of the medium guide mechanism 46.

As illustrated in FIG. 7, of the plurality of holding members 81, the pair of pressing members 81 located outermost in the width direction X press both end portions, in the width direction X, of the medium M having the maximum width indicated by two-dot chain lines in FIG. 7. In other words, as illustrated in FIG. 9, the pair of pressing members 81 positioned outermost on both sides in the width direction X are positioned between the ribs 54 located outermost in the width direction X and side edges Ms of the medium M having the maximum width.

Further, a discharge mechanism 70 that transports the section of the medium M after the recording is provided at a position downstream of the medium supporting member 50 in the transport direction Y0. The discharge mechanism 70 includes the discharge roller pairs 42. The discharge mechanism 70 includes first rollers 48 positioned upstream of the discharge roller pairs 42 in the transport direction Y0, and second rollers 49 positioned downstream of the discharge roller pairs 42 in the transport direction Y0. Further, a transport mechanism 90 that transports the tray on which the disk is placed when performing the label recording that performs the recording on the label surface of the disk, such as the CDR, DVD, or the like, is assembled to a supporting member 38 in a position downstream of the discharge mechanism 70 in the transport direction Y0. The transport mechanism 90 transports the tray on which the disk is placed from the front side of the recording device 11 toward the recording region of the recording head 25, and, when the label recording ends, the tray is discharged to the front side of the recording device 11. A plurality of transport members 90A that configure the transport mechanism 90 are assembled to the supporting member 38.

As illustrated in FIG. 9, a pressing head 812 has a hammer head shape protruding to both sides, in the width direction X, at a tip portion of an arm 811. The lower end of the pressing head 812 is the contact portion 815 that comes into contact with the surface of the medium M and presses the medium M downward. The pressing member 81 presses the medium M downward as a result of the contact portion 815 of the tip portion of the arm 811 coming into contact with the medium M. Since the contact portion 815 is the lower end portion of the pressing head 812, the contact portion 815 comes into contact with the medium M over a wide region of the surface of the medium M in the width direction X.

Figure 10:
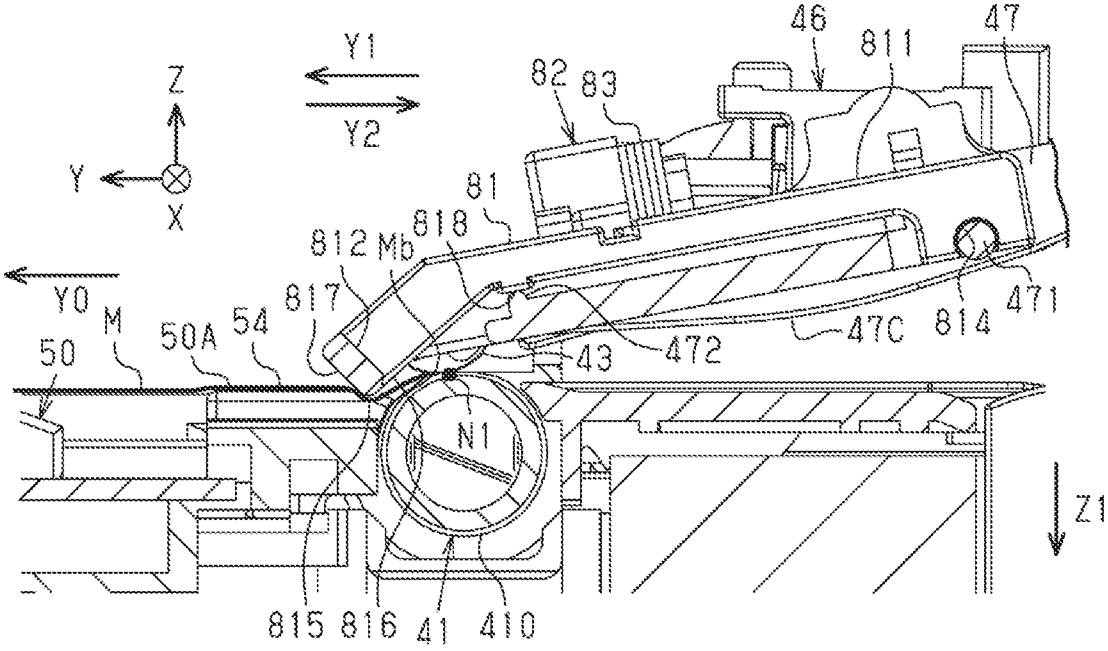
FIG. 10 is a side cross-sectional view illustrating a medium guide mechanism and the pressing member.

As illustrated in FIG. 10, the pressing member 81 is rotatably supported about the support shaft 471. By a stopper portion (not illustrated), so that the pressing head 812 does not move further in the pressing direction PD than the standby position (see FIG. 6), the arm 811 of the pressing member 81 is restricted from rotating any further than that by a stopper portion 818 coming into contact with a restricting portion 472. When performing two-sided recording, the recording device 11 transports the medium M in the first transport direction Y1 in the course of performing the recording on a first surface of the medium M, and when the recording on the first surface ends, the medium M is transported in the second transport direction Y2. The medium M transported in the second transport direction Y2 is inverted by an inversion mechanism (not illustrated) and after that, the medium M is once more fed toward the recording region in which the recording head 25 performs the recording.

As illustrated in FIG. 10, the pressing member 81 includes a first guide surface 816 that guides a tip end Ma of the medium M transported in the first transport direction Y1 to the contact portion 815, and a second guide surface 817 that guides a rear end Mb of the medium M transported in reverse in the second transport direction Y2 to the contact portion 815.

The first guide surface 816 is an inclined surface that is inclined at an acute angle with respect to the first transport direction Y1 such that when the tip end of the medium M comes into contact with the first guide surface 816, the first guide surface 816 rotates the pressing member 81 upward as a result of a force received from the medium M. Further, the second guide surface 817 is an inclined surface that is inclined at an acute angle with respect to the second transport direction Y2 such that when the rear end Mb of the medium M comes into contact with the second guide surface 817, the second guide surface 817 rotates the pressing member 81 upward as a result of a force received from the medium M.

As illustrated in FIG. 6, when the pressing member 81 is in the standby position, the contact portion 815 is positioned below the support surface 50A of the ribs 54. Thus, the medium M that has a relatively low rigidity, such as the normal paper, for example, is pressed downward by the pressing member 81. As a result, as illustrated in FIG. 9, the medium M curves in the wave-like shape in the width direction X. This wave-like shape imparts tension to the medium M in the transport direction Y0. As a result of this tension, the medium M is less likely to curve in the transport direction Y0. In other words, floating of the tip portion and the rear end portion of the medium M is suppressed.

In a course of being transported from the start of the recording to the end of the recording, the medium M passes through a first transport process in which, of the transport roller pairs 41 and the discharge roller pairs 42, the medium M is only nipped by the transport roller pairs 41, a second transport process in which the medium M is nipped by both the transport roller pairs 41 and the discharge roller pairs 42, and a third transport process in which the medium M is nipped only by the discharge roller pairs 42.

When the medium M is pressed downward by the pressing member 81, the medium M receives a frictional force from a section in contact with the pressing member 81, which is in contact with the surface of the medium M at a predetermined contact pressure. This frictional force is a braking force that causes the transport position of the medium M to shift to a negative side in the transport direction Y0. Thus, the transport of the medium M is controlled such that the medium M can stop in a target position, taking into account this braking force.

As illustrated in FIG. 10, in the course of transitioning from the second transport process to the third transport process, when the rear end Mb of the medium M leaves the nip position N1 of the transport roller pair 41, the transport driving roller 410 pushes out the rear end Mb of the medium M at a higher velocity than the transport velocity up to that time, and a kicking phenomenon occurs. A kicking force at this time causes the transport position of the medium M to shift to a positive side.

Figure 11:
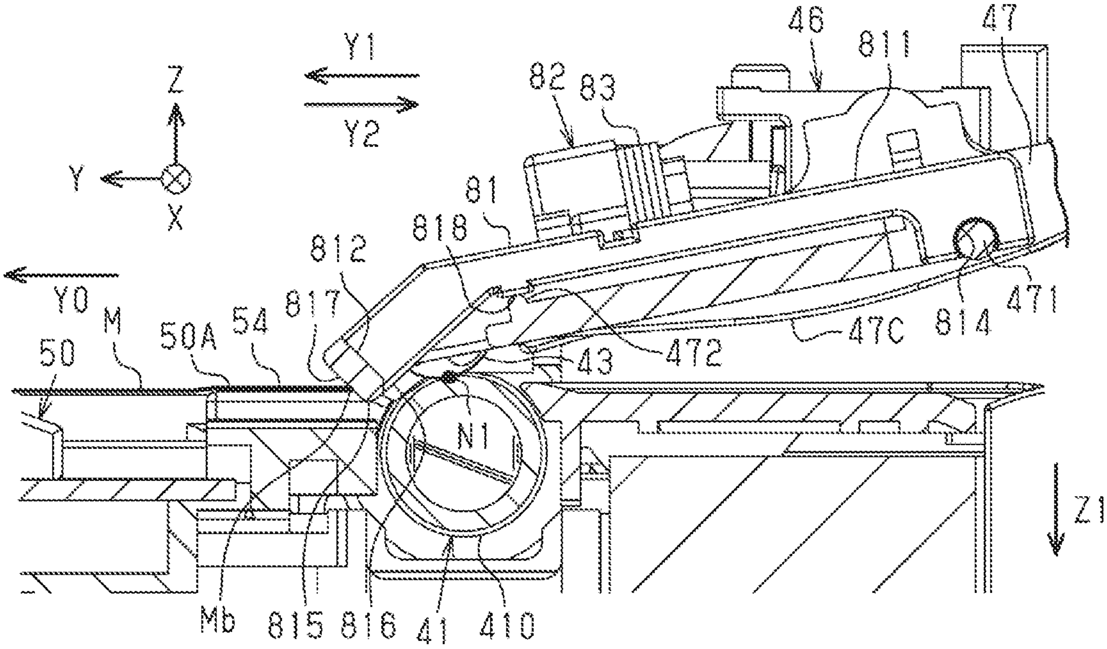
FIG. 11 is a side cross-sectional view illustrating the medium guide mechanism and the pressing member.

Furthermore, as illustrated in FIG. 11, the pressing member 81 applies an external force to the medium M, which can cause a deterioration in the transport position accuracy of the medium M. In other words, when the rear end Mb of the medium M separates from the contact portion 815 of the pressing member 81, the kicking phenomenon occurs in which the second guide surface 817 of the pressing member 81 pushes out the rear end Mb of the medium M. While pressing the medium M downward, the contact portion 815 of the pressing member 81 is displaced upward from the standby position by a reaction force received from the medium M in resistance to the urging force of the elastic member 83. After that, in the moment at which the rear end Mb of the medium M is released from the contact portion 815, the contact portion 815 of the pressing member 81 is displaced downward toward the standby position by the urging force of the elastic member 83. The kicking phenomenon occurs in which the second guide surface 817 that is displaced downward in this way pushes out the rear end Mb of the medium M in the transport direction Y0 at a higher velocity than the original transport velocity.

Furthermore, when the medium M is pressed downward by the contact portion 815 of the pressing member 81, the medium M curves, and when the curvature is restored to an original state in the moment at which the rear end Mb of the medium M separates from the contact portion 815, the medium M is pushed out in the transport direction Y0 as a reaction to the rear end Mb of the medium M pushing the second guide surface 817, and this becomes part of the kicking force. This kicking force causes the transport position of the medium M to shift to the positive side. In this way, when the medium M during recording transitions from the second transport process to the third transport process, the medium M is subject to the kicking phenomenon twice, once when the rear end Mb of the medium M is released from the nip state of the transport roller pair 41, and once when the rear end Mb of the medium M is released from the pressing member 81.

Further, since a nip force of the discharge roller pair 42 is smaller than that of the transport roller pair 41, the medium M that is subject to the kicking force is likely to slip at the nip position of the discharge roller pair 42. This is also a cause of the deterioration in the transport position accuracy due to the kicking of the medium M. A serrated roller is used as the discharge driven roller 44 of the discharge roller pair 42, in order to reduce a contact area with the recording surface of the medium M. Thus, if the force with which the discharge roller pair 42 nips the recorded medium M is too strong, the medium M is susceptible to damage by the teeth of the discharge driven roller 44. Further, when the transport amount by which the transport roller pair 41 transports the medium M differs from the transport amount by which the discharge roller pair 42 transports the medium M, slippage occurs at one of the roller pairs 41 and 42. The slippage of the medium M at the transport roller pair 41 causes the deterioration in the transport position accuracy of the medium M.

Thus, the nip force of the transport roller pair 41 is caused to be stronger than the nip force of the discharge roller pair 42. At this time, when the transport amount of the discharge roller pair 42 is greater than the transport amount of the transport roller pair 41, a force is generated with which the discharge roller pair 42 pulls the medium M downstream in the transport direction Y0, which causes the deterioration in the transport position accuracy of the medium M to the positive side. Thus, strictly speaking, the transport amount of the discharge roller pair 42 is made smaller than the transport amount of the transport roller pair 41, and the slippage of the medium M is caused to occur at the nip location of the discharge roller pair 42. Thus, the nip force of the discharge roller pair 42 is caused to be weaker than the nip force of the transport roller pair 41. Note that the transport amount of both the roller pairs 41 and 42 may be set as appropriate.

Figure 12:
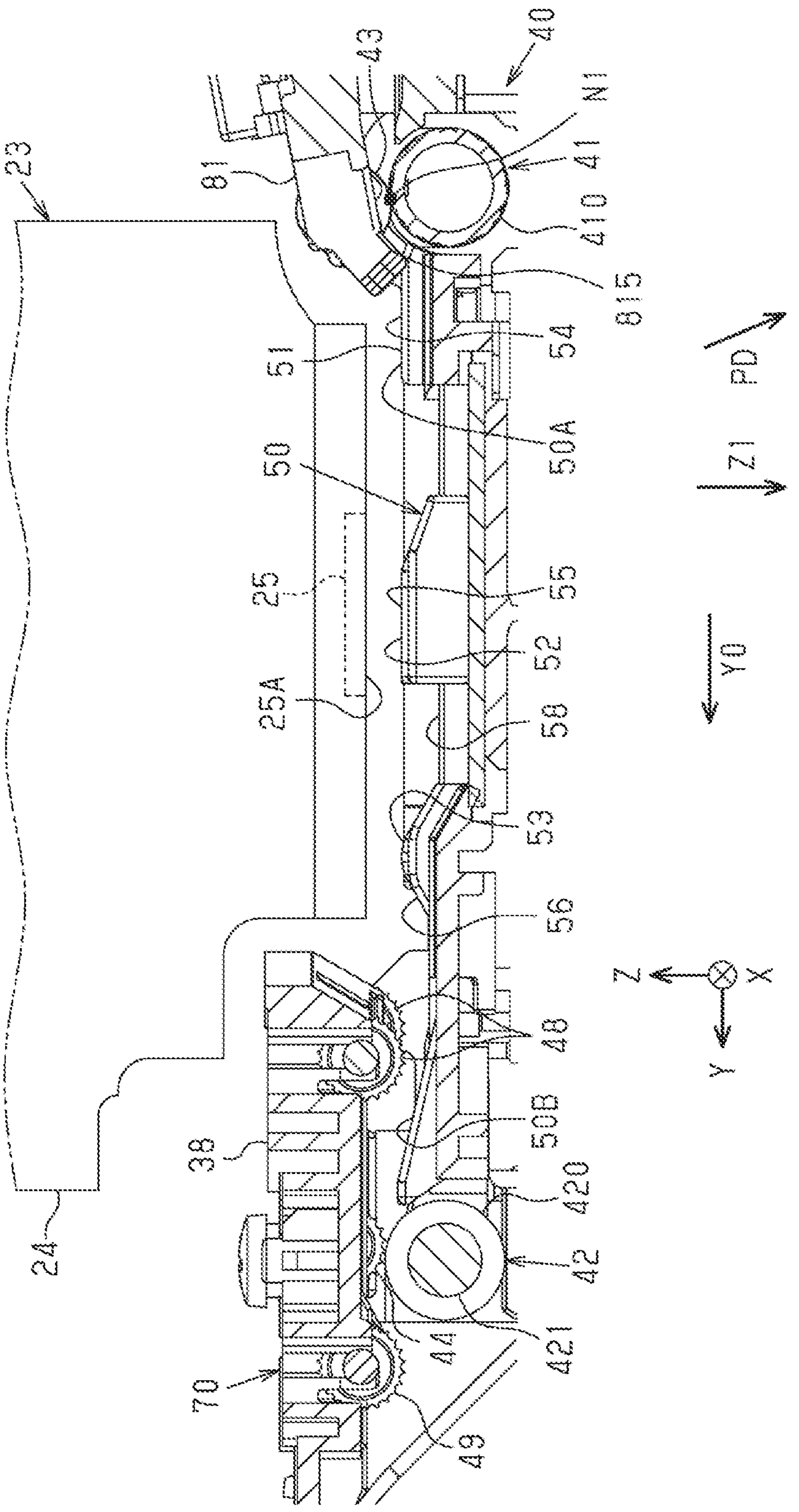
FIG. 12 is a side cross-sectional view illustrating a portion of the transport unit and the recording unit.
Figure 15:
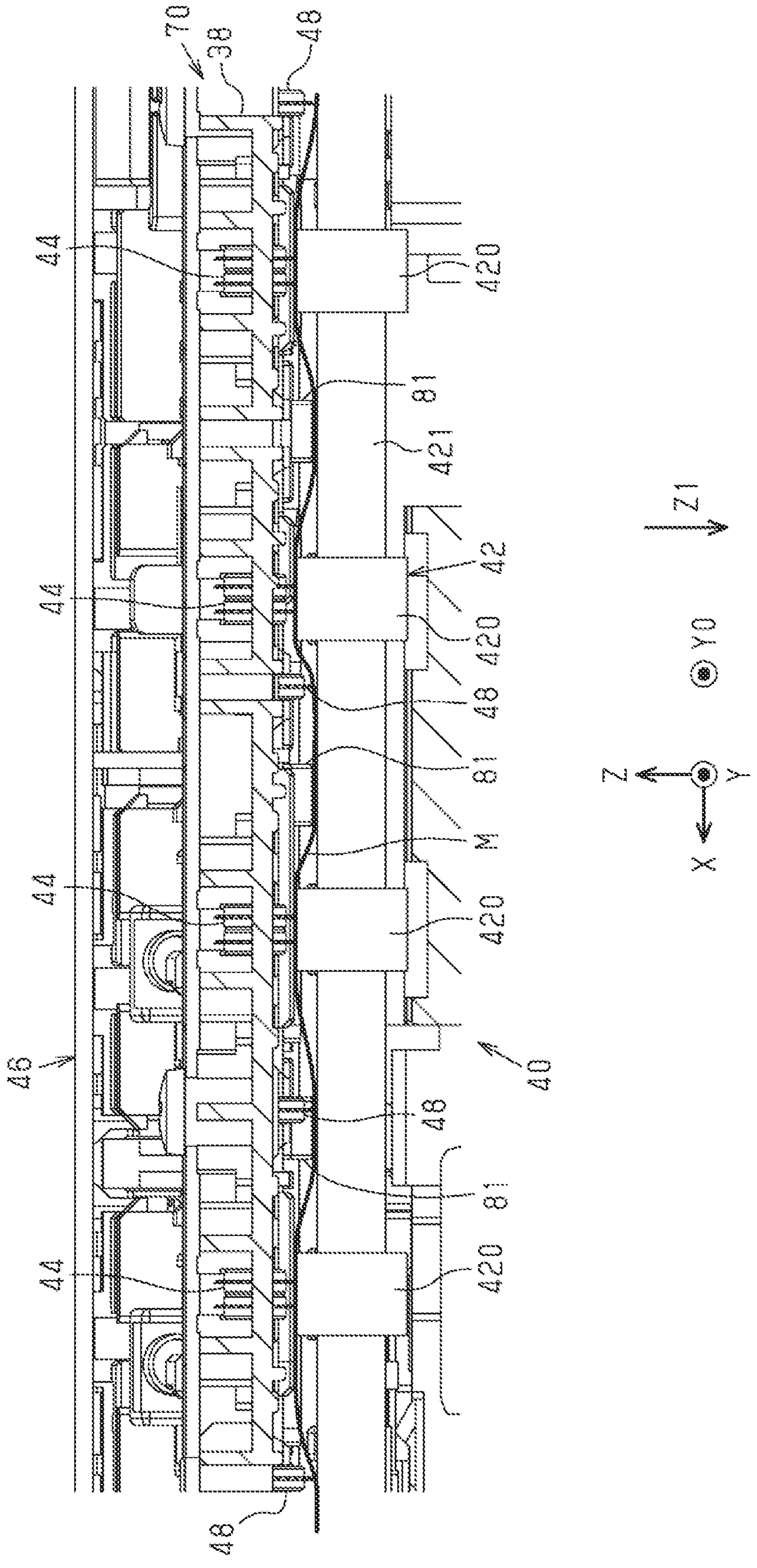
FIG. 15 is a front cross-sectional view illustrating a portion of the transport unit.

The recording device 11 according to the embodiment includes the discharge mechanism 70 illustrated in FIG. 12, in order to suppress the deterioration in the transport position accuracy of the medium M due to the above-described kicking phenomenon. The discharge mechanism 70 includes the discharge roller pairs 42. Specifically, the discharge mechanism 70 includes the discharge roller pairs 42, the first rollers 48 provided upstream of the discharge roller pairs 42 in the transport direction Y0, and the second rollers 49 provided downstream of the discharge roller pairs 42 in the transport direction Y0. The discharge roller pair 42 is formed by the discharge driving roller 420 and the discharge driven rollers 44, which are provided downstream of the first roller 48 in the transport direction Y0. As illustrated in FIG. 12 and FIG. 15, a plurality of the discharge driving rollers 420 are provided at intervals along the axial direction of a rotary shaft 421. The plurality of discharge driven rollers 44 are provided at positions facing each of the discharge driving rollers 420. The discharge driven roller 44 is, for example, a serrated roller having a plurality of pointed teeth at a constant pitch on the outer circumference thereof.

The discharge mechanism 70 is provided with the supporting member 38 that supports the first rollers 48, the discharge driven rollers 44, and the second rollers 49. The first rollers 48, the discharge driven rollers 44, and the second rollers 49 are rotatably supported in a state in which the first rollers 48, the discharge driven rollers 44, and the second rollers 49 can be displaced upward while resisting the urging force. The first rollers 48 and the second rollers 49 are disposed on both sides of the discharge roller pairs 42, so as to sandwich the roller pairs 42 in the transport direction Y0. In the embodiment, the first roller 48 and the second roller 49 configure an example of a guide roller. Note that the first roller 48 and the second roller 49 are also referred to as guide rollers 48 and 49. The guide rollers 48 and 49 are provided downstream of the medium supporting member 50 in the transport direction Y0, and on the same side as the discharge driven rollers 44 with respect to the transport path of the medium M, that is, above the transport path of the medium M. In other words, the guide rollers 48 and 49 are provided downstream of the recording head 25 in the transport direction Y0, and on the same upper side as the discharge driven rollers 44 with respect to the transport path of the medium M.

The first rollers 48 are provided in positions between the recording head 25 and the discharge roller pairs 42 in the transport direction Y0. The first rollers 48 are positioned above the transport path of the medium M, in positions further downstream, in the transport direction Y0, than a scanning path along which the recording head 25 moves in the scanning direction X. As a result of the first rollers 48 coming into contact with the recording surface of the medium M that is trying to float upward, which is a direction from the transport path approaching the recording head 25, the floating of the medium M is suppressed. The first roller 48 is a guide roller that is rotated by being driven by the movement of the medium M, as a result of coming into contact with the medium M during transport. Then, the first rollers 48 come into contact with the medium M and guide the medium M so that the medium M does not deviate from the transport path. The first roller 48 is, for example, a serrated roller having a plurality of pointed teeth at a constant pitch on the outer circumference thereof. Therefore, even when the first roller 48 comes into contact with the recording surface of the medium M, a failure such as ink smearing or the like is less likely to occur. Note that, in a position downstream of the medium supporting member 50 in the transport direction Y0, on a section further downstream, in the transport direction Y0, than a position facing the first roller 48, a guide surface 50B is disposed that guides the medium M to the nip position of the discharge roller pair 42.

Figure 13:
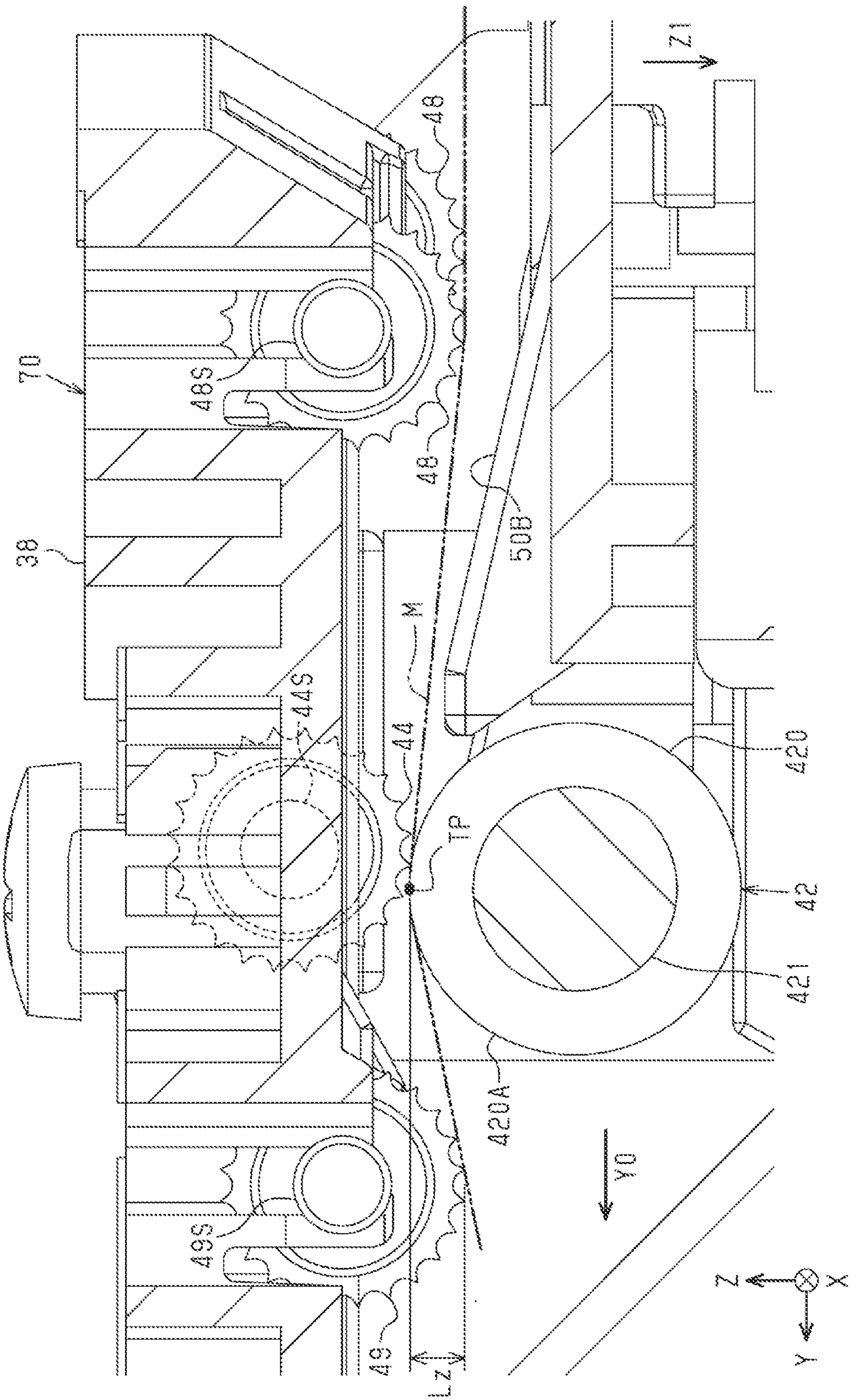
FIG. 13 is a side cross-sectional view illustrating a discharge mechanism.

As illustrated in FIG. 13, the lower end of the second roller 49 is located lower than an upper end TP of the discharge driving roller 420. Specifically, the lower end of the second roller 49 is positioned lower than the upper end TP of the discharge driving roller 420 by an overlap amount Lz. Thus, the second roller 49 includes a function to press the medium M against an outer circumferential surface 420A of the discharge driving roller 420. In other words, the second roller 49 increases a winding amount by which the medium M is wound around the outer circumferential surface 420A of the discharge driving roller 420. When this winding amount increases, a contact area between the discharge driving roller 420 and the medium M increases.

In a side view illustrated in FIG. 13, the upper end TP on the outer circumferential surface 420A of the discharge driving roller 420 is positioned above a virtual line that joins the lower end of the first roller 48 and the lower end of the second roller 49 in a straight line. Thus, the medium M guided by the first roller 48 and the second roller 49 is wound around a region near the upper end on the outer circumferential surface 420A of the discharge driving roller. The contact area between the medium M and the outer circumferential surface 420A increases in accordance with the winding amount of the medium M. This increase in contact area increases contact friction resistance between the medium M and the outer circumferential surface 420A. The contact friction resistance acts as a braking force on the medium M transported in the transport direction Y0. The second roller 49 is, for example, a serrated roller having a plurality of pointed teeth at a constant pitch on the outer circumference thereof.

The greater the distance from the upper end TP of the discharge driving roller 420 to each of the lower end of the first roller 48 and the lower end of the second roller 49, the greater the winding amount of the medium M with respect to the outer circumferential surface 420A. If the winding amount is too large, the medium M becomes less likely to slip at the nip location of the discharge roller pair 42 due to the excessive contact friction resistance, which causes a deterioration in the transport position accuracy of the medium M. The deterioration in the transport position accuracy of the medium M causes a recording position shift failure. Therefore, the overlap amount Lz between the second roller 49 and the discharge driving roller 420 is adjusted so that the winding amount of the medium M with respect to the outer circumferential surface 420A is not excessive.

When the medium M is pressed downward by the lower end of the second roller 49 to a position lower than the upper end TP of the discharge driving roller 420, a see-saw phenomenon occurs in which, with the upper end TP of the discharge driving roller 420 as a fulcrum, a section of the medium M upstream of the upper end TP is lifted up. In particular, in the second medium M that has the high rigidity, such as the photographic paper, a floating amount of the medium M due to this see-saw phenomenon increases. As a result, there is an increased possibility that the section of the medium M that has floated may come into contact with the nozzle surface 25A of the recording head 25.

In other words, if the overlap amount Lz is too large, due to the see-saw phenomenon, the section of the medium M upstream of the upper end TP is significantly lifted up, and there is a possibility that this section may come into contact with the nozzle surface 25A. When the medium M comes into contact with the nozzle surface 25A, the surface of the medium M is contaminated with the ink, or the ink on the surface of the medium M mixes with the ink of the nozzle, causing color mixing. Further, since the recording head 25 is a component including built-in precision electronic components, such as piezoelectric elements, and is relatively vulnerable to impact, there is a possibility that recording head 25 may be damaged by the medium M coming into contact with the nozzle surface 25A.

The floating amount of the medium M due to the see-saw phenomenon tends to increase as the overlap amount Lz increases. Thus, the overlap amount Lz is suppressed to a predetermined dimension or less.

However, in order to gain the winding amount, a dimension may be made large of a section, in a vertical direction Z1, of the discharge driving roller 420 that is positioned above a virtual line joining, in a straight line, the lower end of the first roller 48 and the lower end of the second roller 49. To do so, the overlap amount Lz may be increased, but, since there is concern over the contact between the medium M that has floated due to the above-described see-saw phenomenon, and the nozzle surface 25A, there is demand to keep the overlap amount Lz small.

Thus, in the embodiment, the lower end of the first roller 48 is disposed lower than the upper end TP (see FIG. 13) of the discharge driving roller 420. In other words, in the embodiment, the lower end of the first roller 48 and the lower end of the second roller 49 are both disposed lower than the upper end TP of the discharge driving roller 420. As a result, the virtual line that joins the lower end of the first roller 48 and the lower end of the second roller 49 in the straight line is close to horizontal. For this reason, while keeping the overlap amount Lz relatively small, the dimension, in the vertical direction Z1, of the section of the discharge driving roller 420 positioned above the virtual line can be secured to be large. As a result, the required winding amount is secured while keeping the overlap amount Lz relatively small.

On the other hand, if the position of the lower end of the first roller 48 is excessively lower than the upper end TP of the discharge driving roller 420, the first roller 48 firmly presses the medium M. This causes the recording surface of the medium M to be damaged. Therefore, in order to avoid excessively lowering the lower end of the first roller 48, in the embodiment, a difference in dimensions, in the vertical direction Z1, between the lower end of the first roller 48 and the lower end of the second roller 49 is set to be equal to or less than the overlap amount Lz. In particular, in the present example, the lower end of the first roller 48 and the lower end of the second roller 49 are disposed at the same height position in the vertical direction Z1. As a result, the required winding amount can be secured with the small overlap amount Lz, and also, since the first roller 48 and the second roller 49 are inhibited from pressing the medium M with an excessive force, the recording surface of the medium M is less likely to be damaged.

Figure 14:
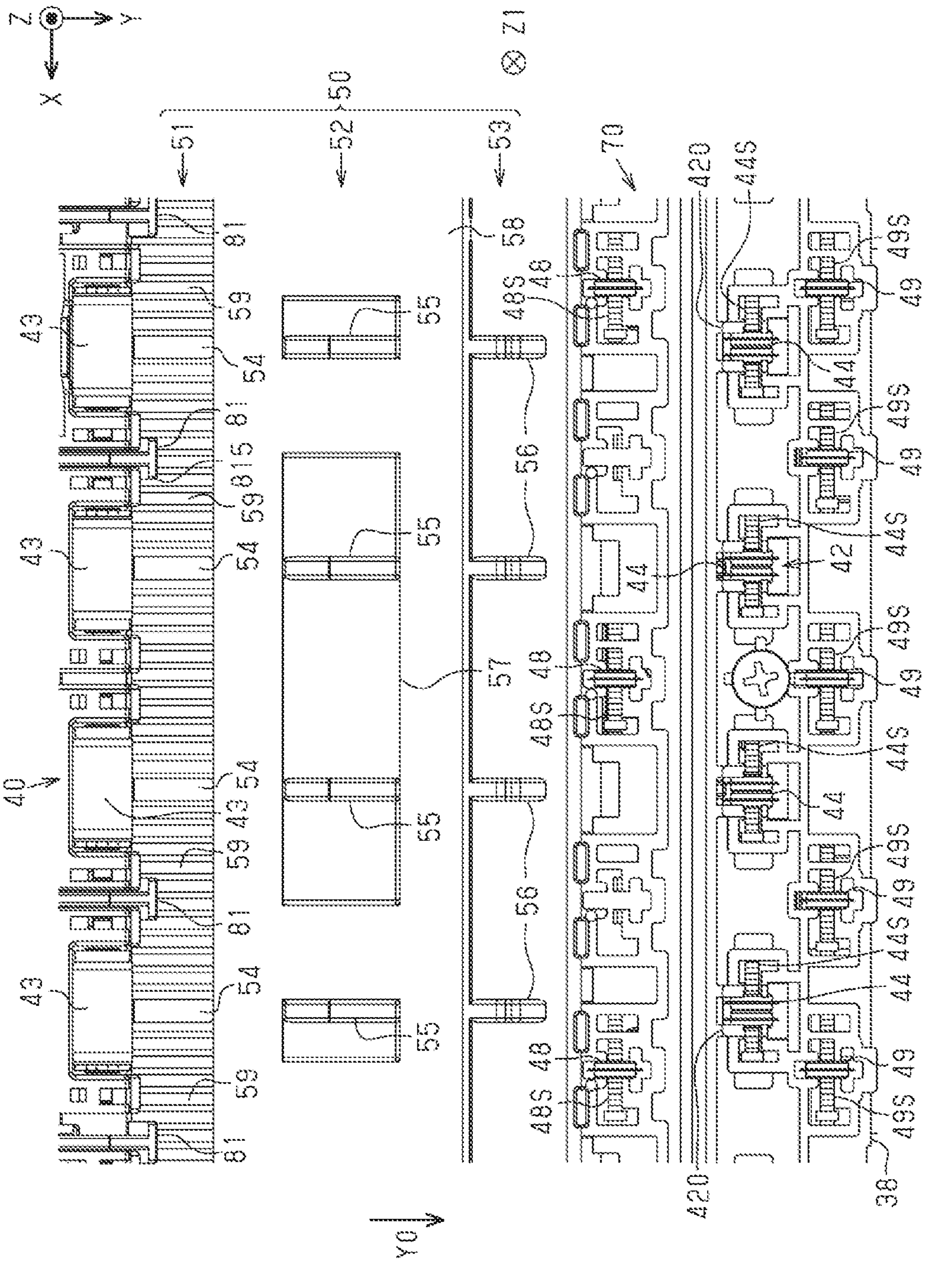
FIG. 14 is an enlarged plan view illustrating a portion of the transport unit.

As illustrated in FIG. 7 and FIG. 14, the first rollers 48 are disposed in positions between the discharge driven rollers 44 whose positions are adjacent in the width direction X. Further, the second rollers 49 are also disposed in positions between the discharge driven rollers 44 whose positions are adjacent in the width direction X. Then, the positions of the first rollers 48 and the second rollers 49 are the same in the width direction X.

As illustrated in FIG. 7 to FIG. 9 and FIG. 14, the medium supporting member 50 is alternately provided with the ribs 54 having the support surface 50A that supports the medium M and the recessed regions 59, which are the regions other than the ribs 54, in the width direction X. The positions of the second rollers 49 in the width direction X are the same as those of the recessed regions 59.

Further, as illustrated in FIG. 12, the pressing member 81 is provided that presses the medium M to a position lower than the support surface 50A of the medium supporting member 50 at a position further upstream than the recording position of the recording unit 23 in the transport direction Y0. As illustrated in FIG. 7 and FIG. 14, the positions of the second rollers 49 in the width direction X are the same as those of the pressing members 81.

Further, as illustrated in FIG. 13 and FIG. 14, the first roller 48 is urged downward by a first urging force, in a state in which the first roller 48 can be displaced upward. Further, the second roller 49 is urged downward by a second urging force in a state in which the second roller 49 can be displaced upward. Furthermore, the discharge driven roller 44 is urged by a third urging force toward the discharge driving roller 420 in a state in which the discharge driven roller 44 can be displaced upward. In other words, the first roller 48, the second roller 49, and the discharge driven roller 44 are provided so as to be able to be displaced upward against the respective urging forces.

Here, the first urging force of the first roller 48 is F1, the second urging force of the second roller 49 is F2, and the third urging force of the discharge driven roller 44 is F3. The first urging force F1 of the first roller 48 and the second urging force F2 of the second roller 49 are smaller than the third urging force F3 of the discharge driven roller 44. In other words, F1 is smaller than F3 and F2 is smaller than F3. The first urging force F1 of the first roller 48 and the second urging force F2 of the second roller 49 are the same (F1 is equal to F2). Note that the first urging force F1 and the second urging force F2 may be different from each other.

As illustrated in FIG. 13 and FIG. 14, the first roller 48 is rotatably supported about a rod spring 48S. In addition, the second roller 49 is rotatably supported about a rod spring 49S. Furthermore, the discharge driven roller 44 is rotatably supported about a rod spring 44S.

The reason for the discharge driven roller 44 being urged downward in the state in which the discharge driven roller 44 can be displaced upward is so that the discharge roller pair 42 can nip the medium M having a different thickness. Further, the reason for the first roller 48 being urged downward in the state in which the first roller 48 can be displaced upward is so that the first medium M that has the low rigidity is pressed downward and the floating of the medium M is thus suppressed, and, with respect to the second medium M that has the high rigidity and that is less likely to float, the reason is so that an unnecessary load is not applied to the medium M that does not significantly displace downward and deformation or the like is thus not caused.

Also, the reason for the second roller 49 being urged downward in the state in which the second roller 49 can be displaced upward is as follows. The first medium M having the low rigidity is pressed by a necessary displacement amount that is relatively large, and thus the necessary contact friction force between the medium M and the discharge driving roller 420 can be obtained. On the other hand, for the second medium M having the high rigidity, the required contact friction force is obtained between the second medium M and the outer circumferential surface 420A even when the displacement amount in the downward direction is small. Therefore, for the second medium M having the high rigidity, the required contact friction force can be obtained between the second medium M and the outer circumferential surface 420A by pressing the medium M by the small displacement amount, without applying a load that would cause unnecessary deformation or the like to the medium M.

In FIG. 13, a distance in the transport direction Y0 between the center of the first roller 48 and the upper end TP of the discharge driving roller 420 is a first distance D1. Further, a distance in the transport direction Y0 between the center of the second roller 49 and the upper end TP of the discharge driving roller 420 is a second distance D2. As illustrated in FIG. 13, the second distance D2 in the transport direction Y0 between the second roller 49 and the upper end TP of the discharge driving roller 420 is shorter than the first distance D1 in the transport direction Y0 between the first roller 48 and the upper end TP of the discharge driving roller 420 (D1 is greater than D2).

The longer the second distance D2, the greater the overlap amount Lz needed to secure the required winding amount. In the embodiment, the second distance D2 is shorter than the first distance D1, thus making it possible to reduce the overlap amount Lz compared to a case in which the second distance D2 is the same as the first distance D1. For example, it is possible to avoid excessively pressing the second medium M with the high rigidity by the second roller 49. Specifically, although the second roller 49 can be displaced upward against the second urging force F2 of the rod spring 49S, the displacement amount thereof has an upper limit, and if the second roller 49 still excessively presses the second medium M even when displaced as far as the upper limit, the load is applied to the medium M. In the embodiment, by reducing the overlap amount Lz, the load is prevented from being applied to the second medium M having the high rigidity in this way.

The control unit 100 illustrated in FIG. 1 performs various controls including recording control for the recording device 11. The control unit 100 is provided with one or more processors that operate in accordance with a computer program (software). Along with a CPU, the processor includes a memory, such as a RAM, a ROM, and the like, and stores program codes or commands that cause the CPU to execute processing. The control unit 100 is not limited to performing software processing. For example, the control unit 100 may be provided with a dedicated hardware circuit (an application specific integrated circuit: ASIC, for example) that performs hardware processing for at least a part of processing executed by the control unit 100 itself.

As an output system, the feed motor 35, the transport motor 71, the carriage motor 32, the recording head 25, and the gap adjustment mechanism 37 are electrically coupled to the control unit 100. The control unit 100 controls the feed motor 35, the transport motor 71, the carriage motor 32, the recording head 25, and the gap adjustment mechanism 37. Further, as an input system, the medium detector 76, the linear encoder 34, and the rotary encoder 74 are electrically coupled to the control unit 100.

The control unit 100 takes, as a origin position, a position of the medium M when the tip end of the medium M fed by the feed unit 21 is detected by the medium detector 76, and, by counting up a number of pulse edges of a detection signal input from the rotary encoder 74, counts a value corresponding to the position of the tip end or the rear end of the medium M. The control unit 100 controls the motors 35 and 71 of the transport system based on the counted position of the tip end or the rear end of the medium M, and controls the feed, transport, and discharge of the medium M. The recorded medium M is discharged from the discharge port 75 and placed on the stacker 27.

The control unit 100 takes, as the origin position, a time at which the carriage 24 comes into contact with an end position on the home position HP side, and, by counting up a number of pulse edges of a detection signal input from the linear encoder 34, acquires a carriage position, which is a position in the scanning direction X using the origin position of the carriage 24 as a reference. The control unit 100 controls the carriage motor 32 based on the count value of the carriage position, to perform velocity control and position control of the carriage 24.

The control unit 100 stores, in the memory, reference data indicating a correspondence relationship between the medium type and the gap. When the control unit 100 receives recording data, the control unit 100 acquires medium type information included in the recording data. By referring to the recording data, the control unit 100 acquires a target gap based on the medium type information. The control unit 100 controls the carriage 24 and causes the carriage 24 to perform gap switching control, thus adjusting the gap between the nozzle surface 25A of the recording head 25 and the support surface 50A of the medium supporting member 50 to the target gap.

Next, actions of the recording device 11 will be described. For example, when the recording is performed on the medium M, the medium M fed by the feed unit 21 is transported in the transport direction Y0 by the transport roller pairs 41, as illustrated in FIG. 6. The medium M, of which the tip end Ma passes through the transport roller pairs 41, is pressed downward by the contact portions 815 of the pressing members 81. The plurality of pressing members 81 press the medium M at the plurality of locations at intervals in the width direction X, at positions corresponding to the recessed regions 59 corresponding to the regions between the ribs 54 in the width direction X.

As illustrated in FIG. 9, for example, of the medium M having the low rigidity, such as the normal paper, the sections pressed downward by the pressing members 81 bend, and the medium M curves into the undulating wave-like shape in the width direction X. In particular, the first medium M that has the low rigidity, such as the normal paper, is pressed downward by the pressing members 81, and thus curves into the undulating wave-like shape in the width direction X, as illustrated in FIG. 9. The undulating wave-like shape in the width direction X imparts tension to the medium M in the transport direction Y0. As a result of this tension, it is difficult for the tip portion or the rear end portion of the medium M to curve in a direction in which they float up. In other words, the floating of the tip portion or the rear end portion of the medium M is suppressed.

As a result, the tip portion or the rear end portion of the medium M are prevented from coming into contact with the recording head 25. When the tip portion or the rear end portion of the medium M comes into contact with the nozzle surface 25A of the recording head 25, the medium M is contaminated with the ink, or jamming of the medium M occurs. In contrast, in the embodiment, the floating of the tip portion or the rear end portion of the medium M is suppressed, and it is thus possible to avoid the contamination and jamming of the medium M caused by the tip portion or the rear end portion of the medium M coming into contact with the nozzle surface 25A of the recording head 25.

Further, for example, the medium M having the relatively high rigidity, such as the photographic paper, lifts the pressing heads 812 while resisting the urging force of the elastic member 83 as a result of the tip end Ma coming into contact with the first guide surface 816. As a result, the medium M having the high rigidity, such as the photographic paper, is less likely to deform. As a result, a high resolution image is recorded on the photographic paper.

In the course of being transported from the start of the recording to the end of the recording, the medium M passes through the first transport process in which, of the transport roller pairs 41 and the discharge roller pairs 42, the medium M is only nipped by the transport roller pairs 41, the second transport process in which the medium M is nipped by both the transport roller pairs 41 and the discharge roller pairs 42, and the third transport process in which the medium M is nipped only by the discharge roller pairs 42.

As illustrated in FIG. 10, when transitioning from the second transport process to the third transport process, when the rear end Mb of the medium M leaves the nip position N1 of the transport roller pair 41, the kicking phenomenon occurs in which the rear end Mb of the medium M is kicked out.

Furthermore, as illustrated in FIG. 11, when the rear end Mb of the medium M separates from the contact portion 815 of the pressing member 81, the kicking phenomenon occurs in which the second guide surface 817 of the pressing member 81 kicks out the rear end Mb of the medium M. The kicking force with which the medium M is pushed out from the pressing member 81 in the transport direction Y0 at the higher velocity than the original transport velocity causes the transport position of the medium M to shift to the positive side.

When transitioning from the second transport process to the third transport process, a section of the medium M downstream of the recording region is nipped by the discharge roller pair 42 that configures the discharge mechanism 70. The lower end of the first roller 48 and the lower end of the second roller 49 are positioned lower than the upper end TP on the outer circumferential surface 420A of the discharge driving roller 420. Thus, the medium M guided in contact with the lower end of the first roller 48 and the lower end of the second roller 49 is pressed against the outer circumferential surface 420A of the discharge driving roller, and is wound around the region near the upper end on the outer circumferential surface 420A. The contact area between the medium M and the outer circumferential surface 420A increases in accordance with the winding amount of the medium M. This increase in contact area increases the contact friction resistance between the medium M and the outer circumferential surface 420A. The contact friction resistance acts as a braking force on the medium M transported in the transport direction Y0. As a result, even if the rear end Mb of the medium M is kicked out by the transport roller pair 41 and the pressing member 81, the deterioration in the transport position accuracy of the medium M is suppressed.

Further, in the second transport process, the positions of the pressing members 81 and the discharge driving rollers 420 in the width direction X are the same, so the positions in the width direction X at which the ridge portions are formed are the same in a section of the medium M upstream of the recording region and a section of the medium M downstream of the recording region. Further, the positions in the width direction X of the first rollers 48 and the second rollers 49 are the same, and the positions in the width direction X of both the rollers 48 and 49 correspond to the recessed regions 59. Thus, the positions in the width direction X at which the valley portions are formed are the same in the section of the medium M upstream of the recording region and the section of the medium M downstream of the recording region.

Figure 16:
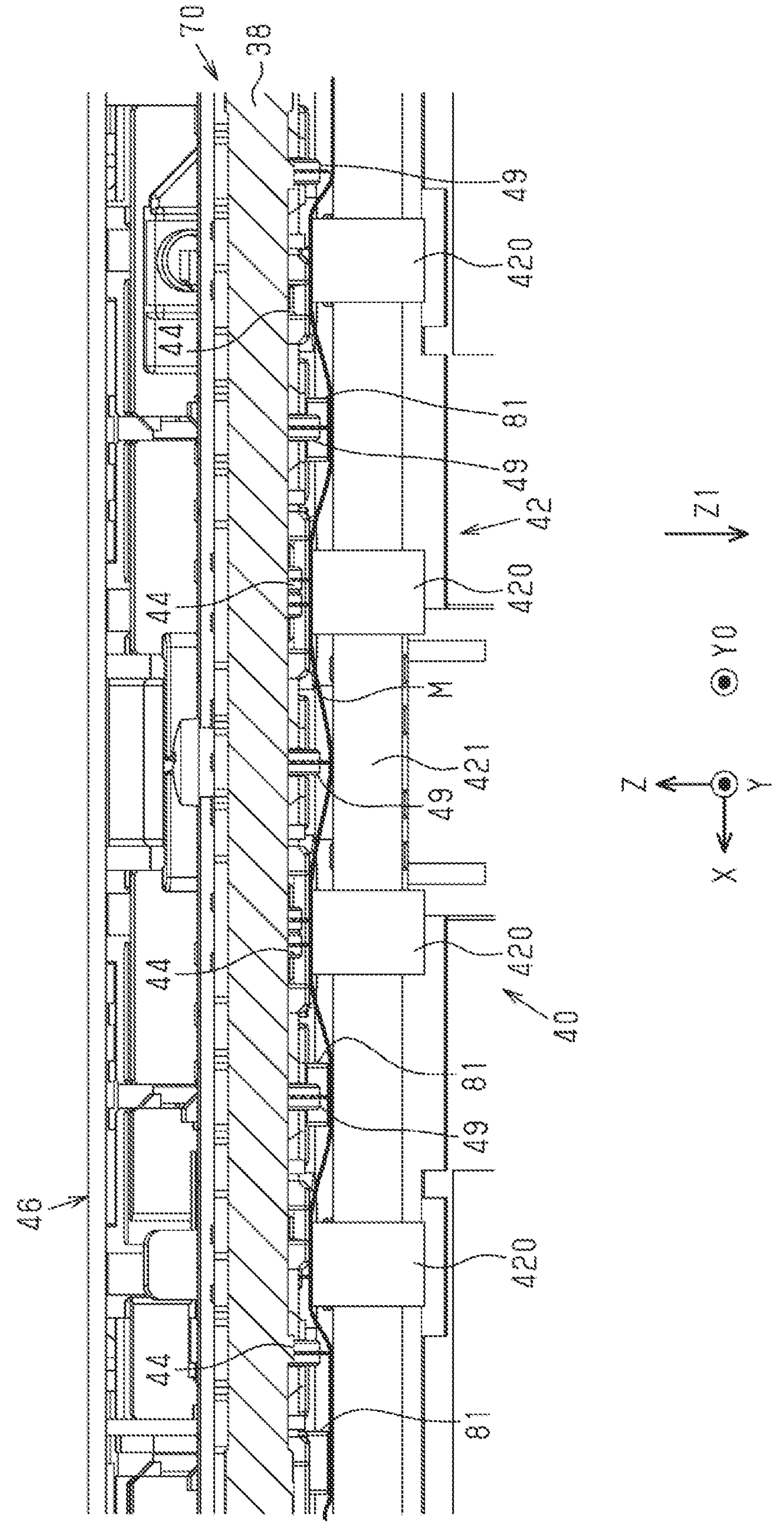
FIG. 16 is a front cross-sectional view illustrating a portion of the transport unit.

Furthermore, in the third transport process, as illustrated in FIG. 15, the medium M curves into the wave-like shape in which the nip position of the discharge roller pair 42 is the ridge portion and the position at which the first roller 48 presses the medium M downward is the valley portion. Further, since the positions in the width direction X of the first rollers 48 and the second rollers 49 are the same, as illustrated in FIG. 16, the nip position of the discharge roller pair 42 is the ridge portion, and the position at which the second roller 49 presses the medium M downward is the valley portion.

This undulating wave-like shape in the width direction X imparts tension to the medium M in the transport direction Y0. As a result of this tension, the floating of the rear end portion of the medium M is suppressed. Thus, in the third transport process, the rear end portion of the medium M is prevented from coming into contact with the recording head 25. As a result, the ink contamination and jamming of the medium M can be avoided in the third transport process also.

According to the embodiment described above, the following effects can be obtained.

(1) The recording device 11 is provided with the transport unit 40 that transports the medium M in the transport direction Y0, the medium supporting member 50 including the support surface 50A that supports the medium M, and the recording head 25 that performs the recording on the medium M at the position facing the medium supporting member 50. The transport unit 40 is provided with the transport roller pairs 41 and the discharge roller pairs 42. The transport roller pair 41 is formed by the transport driving roller 410 and the transport driven rollers 43, which are provided upstream of the medium supporting member 50 in the transport direction Y0. The discharge roller pair 42 is formed by the discharge driving roller 420 and the discharge driven rollers 44 provided downstream of the medium supporting member 50 in the transport direction Y0. Furthermore, the transport unit 40 includes the guide rollers 48 and 49 that are provided downstream of the medium supporting member 50 in the transport direction Y0, and on the same upper side as the discharge driven rollers 44 with respect to the transport path of the medium M. The guide rollers 48 and 49 are driven to rotate as a result of the medium M coming into contact therewith. The guide rollers 48 and 49 are provided on either side of the discharge roller pair 42 so as to sandwich the discharge roller pair 42 in the transport direction Y0, and the lower end of at least one of the guide rollers 48 and 49 on either side is positioned lower than the upper end TP of the discharge driving roller 420. Thus, the lower end of at least one of the plurality of guide rollers 48 and 49 is positioned lower than the upper end TP of the discharge driving roller 420, and thus the medium M is pressed firmly against the outer circumferential surface 420A of the discharge driving roller 420. As a result, the winding amount of the medium M wound around the portion of the outer circumferential surface 420A of the discharge driving roller 420 increases and the contact area with the outer circumferential surface 420A increases, and thus, the contact friction resistance with the outer circumferential surface 420A is increased. Thus, even when the rear end Mb of the medium M is kicked out in the moment the rear end Mb is released from the transport roller pair 41, a deterioration in a transport position accuracy of the medium is suppressed by the increased frictional force (the braking force) resulting from the section of the medium M in contact with the discharge driving roller 420 being pressed against the outer circumferential surface 420A.

(2) The guide rollers are provided on either side with respect to the discharge roller pair 42 in the transport direction Y0 and include the first roller 48 provided upstream of the discharge roller pair 42 in the transport direction Y0, and the second roller 49 provided downstream of the discharge roller pair 42 in the transport direction Y0. The lower end of the second roller 49 is positioned lower than the upper end TP of the discharge driving roller 420. Thus, of the first roller 48 and the second roller 49 positioned on both sides of the discharge driving roller 420 in the transport direction Y0, the lower end of the second roller 49 is positioned lower than the upper end TP of the discharge driving roller 420, and thus, the section of the medium M clamped between the discharge roller pair 42 is firmly pressed against the outer circumferential surface 420A of the discharge driving roller 420. Thus, even if the rear end Mb of the medium M is kicked out by the transport roller pair 41 when the rear end Mb is released from the transport roller pair 41, the deterioration in the transport position accuracy of the medium M is suppressed by the increased frictional force (the braking force) resulting from the fact that the medium M is pressed against the outer circumferential surface 420A.

(3) The lower end of the first roller 48 is positioned lower than the upper end TP of the discharge driving roller 420. Thus, the lower end of the first roller 48 and the lower end of the second roller 49 are both positioned lower than the upper end TP of the discharge driving roller 420, and thus the medium M is pressed more firmly against the outer circumferential surface 420A of the discharge driving roller 420. Thus, even if the rear end Mb of the medium M is kicked out by the transport roller pair 41, the deterioration in the transport position accuracy of the medium M is suppressed by the increased frictional force (the braking force) resulting from the medium M being pressed against the outer circumferential surface 420A.

(4) The difference in dimensions, in the vertical direction, between the lower end of the first roller 48 and the lower end of the second roller 49 is set to be equal to or less than the overlap amount between the second roller 49 and the discharge driving roller 420 in the vertical direction. Thus, since the medium M can be firmly pressed against the outer circumferential surface 420A of the discharge driving roller 420 by the lower end of the first roller 48 and the lower end of the second roller 49, the necessary winding amount is secured, and, as a result, failures caused by the medium M being excessively pressed downward by the first roller 48 and the second roller 49 can be suppressed. For example, if the first roller 48 is positioned too far downward, marks and scratches easily occur on the recording surface of the medium M. Further, if the second roller 49 is positioned too far downward, the section of the medium M upstream of the discharge roller pair 42 is lifted up, and the possibility of the rear end portion of the medium M coming into contact with the recording head 25 increases. In contrast, according to this configuration, it is possible to suppress the occurrence of marks and scratches on the recording surface of the medium M, and to suppress the rear end portion of the medium M from floating and coming into contact with the recording head 25. Thus, the deterioration in the transport position accuracy of the medium M due to the kicking phenomenon of the medium M can be suppressed, and thus, failures caused by the medium M being excessively pressed downward by the first roller 48 and the second roller 49 can be suppressed.

(5) The second rollers 49 are disposed in positions corresponding to the positions between the discharge driven rollers 44 in the width direction X. Thus, the wave-like shape is formed in the medium M such that the section that rests on the discharge driving roller 420 is the ridge portion and the portion that is pressed downward by the second roller 49 is the valley portion. Thus, the rear end portion, which is the upstream end portion of the medium M in the transport direction Y0, can be inhibited from floating and coming into contact with the recording head 25.

(6) The first rollers 48 and the second rollers 49 have the same positions in the width direction X. Thus, the medium M is formed in the wave-like shape such that the section resting on the discharge driving roller 420 is the ridge portion, and the sections pressed downward by the first roller 48 and the second roller 49 are the valley portions. Thus, the rear end portion of the medium M can be inhibited from floating and coming into contact with the recording head 25.

(7) The first roller 48 is urged downward by the first urging force F1 in the state in which the first roller 48 can be displaced upward. The second roller 49 is urged downward by the second urging force F2 in the state in which the second roller 49 can be displaced upward. The discharge driven roller 44 is urged downward toward the discharge driving roller 420 by the third urging force F3 in the state in which the discharge driven roller 44 can be displaced upward. The first urging force F1 of the first roller 48 and the second urging force F2 of the second roller 49 are smaller than the third urging force F3 of the discharge driven roller 44. Thus, since the first urging force F1 of the first roller 48 and the second urging force F2 of the second roller 49 are smaller than the third urging force F3 of the discharge driven roller 44, it is possible to suppress the generation of the excessive frictional force due to the medium M being firmly pressed against the outer circumferential surface 420A of the discharge driving roller 420. For example, the overlap amount between the first roller 48 or the second roller 49 and the discharge driving roller 420 changes in accordance with the rigidity of the medium M. As a result, it is possible to suppress the medium M having the high rigidity from being wound by an excessive amount around the outer circumferential surface 420A of the discharge driving roller 420. Thus, it is possible to suppress the deterioration in the transport position accuracy of the medium M caused by the excessive frictional force between the medium M and the discharge roller pair 42 when the medium M is transported.

(8) The second distance between the second roller 49 and the upper end TP of the discharge driving roller 420 in the transport direction Y0 is shorter than the first distance between the first roller 48 and the upper end TP of the discharge driving roller 420 in the transport direction Y0. Thus, it is possible to prevent the second roller 49 from being positioned too far downward. As a result, it is possible to keep small the amount by which the upstream section of the medium M in the transport direction Y0 is lifted up, with the upper end TP of the discharge driving roller 420 as the fulcrum, when the second roller 49 presses the medium M. For example, it is possible to suppress the upstream section of the medium M from being lifted up and coming into contact with the recording head 25.

(9) The medium supporting member 50 alternately includes the ribs 54 and 55 including the support surface 50A that supports the medium M, and the recessed regions 59 formed in the regions other than the ribs 54 and 55 in the width direction X. The positions of the second rollers 49 in the width direction X are the same as those of the recessed regions 59. Thus, the medium M is formed in the wave-like shape in which the section supported by the rib 54 is the ridge portion and the section corresponding to the recessed region 59 and the second roller 49 is the valley portion. Thus, the rear end portion of the medium M can be inhibited from floating and coming into contact with the recording head 25.

(10) The pressing members 81 that press the medium M to a position lower than the support surface of the supporting member of the medium M are provided in positions upstream of the recording position of the recording unit in the transport direction Y0. The second rollers 49 are disposed in positions that are the same, in the width direction X, as those of the pressing members 81. Thus, the medium M is formed in the wave-like shape in which the ridge portions and the valley portions are repeated in the width direction X, such that the sections of the medium M supported by the support surface and the discharge driving rollers 420 are the ridge portions, and the sections of the medium M pressed by the pressing members 81 and the second rollers 49 are the valley portions. As a result, the rigidity of the medium M is increased, and thus, it is possible to inhibit the tip portion of the medium M from floating and coming into contact with the recording head 25, and to inhibit the rear end portion of the medium M from floating and coming into contact with the recording head 25.

(11) The second roller 49, which is an example of the guide roller, is provided on both sides of the discharge driving roller 420 in the width direction X, and the lower ends of the guide rollers 48 and 49 are positioned lower than the upper end TP of the discharge driving roller 420. Thus, the medium M is pressed against the outer circumferential surface 420A of the discharge driving roller 420 by the guide rollers 48 and 49 positioned on both sides of the discharge driving roller 420 in the width direction X. Thus, even if the rear end Mb of the medium M is kicked out by the transport roller pair 41, the deterioration in the transport position accuracy of the medium M can be suppressed by the frictional force (the braking force) resulting from the medium M being pressed against the outer circumferential surface 420A.

Note that the above-described embodiment may be modified, as in the following modified examples. Furthermore, the above-described embodiment and the modified examples described below can be combined as appropriate and used as further modified examples, or combinations of the following modified examples can be combined as appropriate and used as further modified examples.

Figure 17:
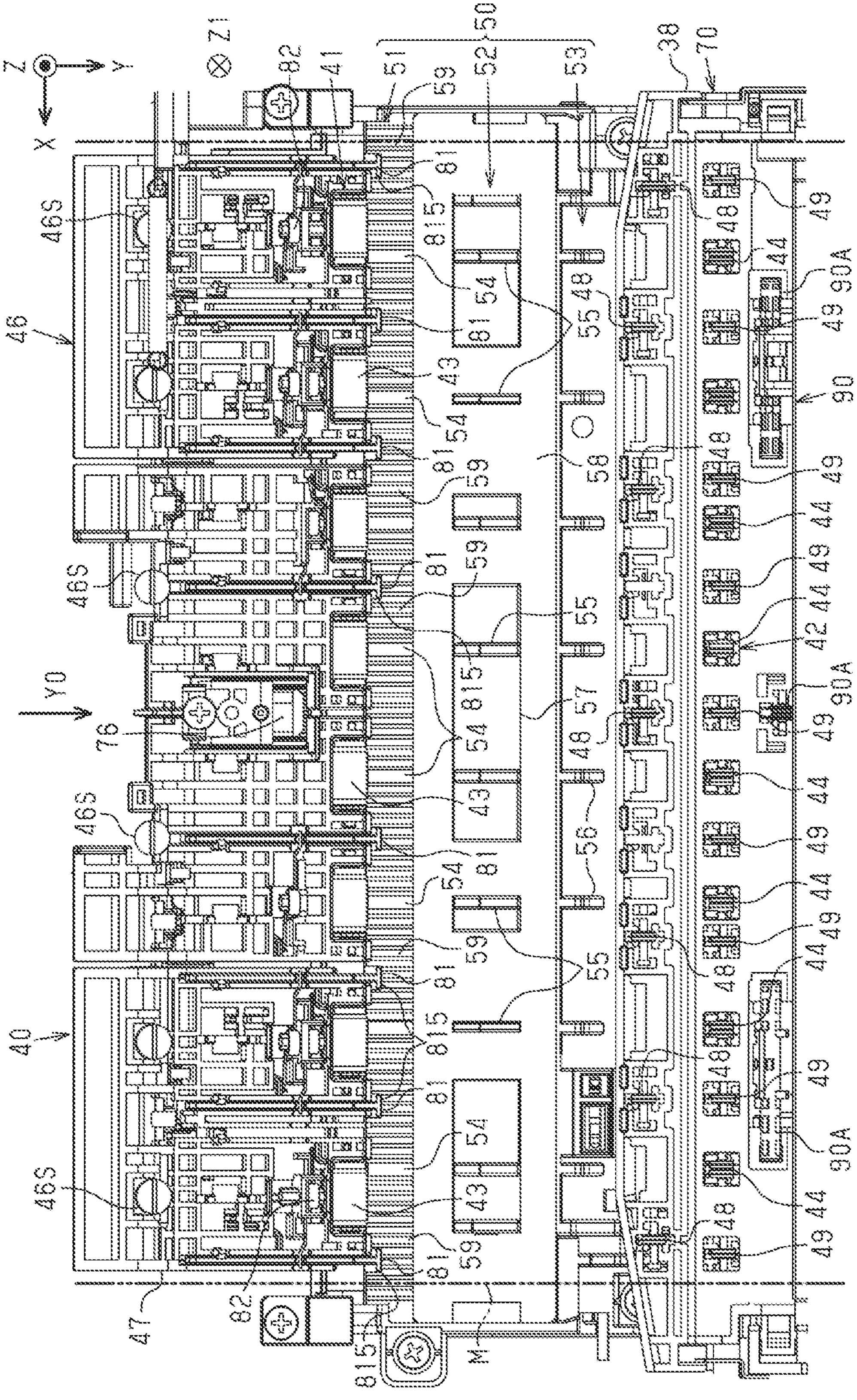
FIG. 17 is a plan view illustrating the transport unit of a modified example.

In place of the configuration in which the guide rollers are provided on both sides of the discharge driven roller 44 in the transport direction Y0, a configuration may be adopted in which the guide rollers are provided on both sides of the discharge driven roller 44 in the width direction X intersecting the transport direction Y0. For example, as illustrated in FIG. 17, a plurality of the discharge driven rollers 44 configuring the discharge roller pairs 42 are arranged at intervals in the width direction X. The plurality of second rollers 49 are disposed at positions on both sides of the discharge driven rollers 44 in the width direction X, such that the second rollers 49 sandwich the discharge driven rollers 44. In the example illustrated in FIG. 17, there are also empty regions in which the second rollers 49 are not located adjacent to the discharge driven rollers 44 in the width direction X, but the second rollers 49 may also be disposed in these empty regions, and all of the discharge driven rollers 44 may be sandwiched between the second rollers 49 in the width direction X.

Figure 18:
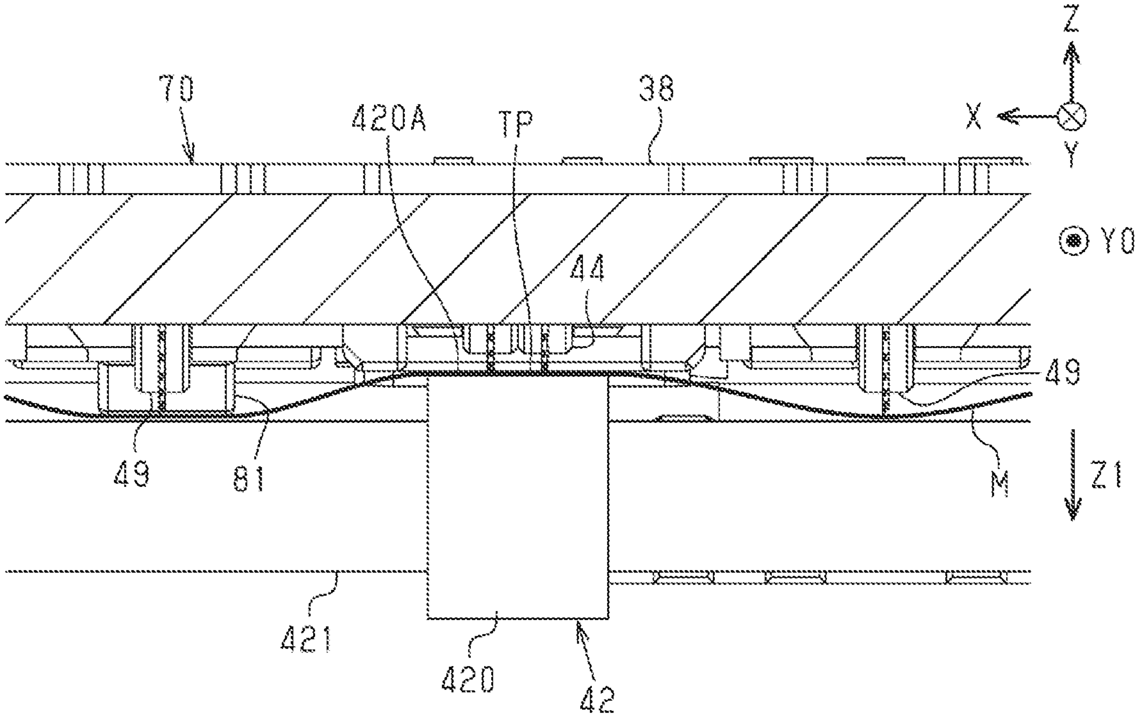
FIG. 18 is a front cross-sectional view illustrating a portion of the discharge mechanism.

As illustrated in FIG. 18, the second rollers 49 are positioned on both sides of the discharge driving roller 420 in the width direction X. The lower end of the second roller 49 is positioned lower than the upper end TP of the discharge driving roller 420. The two second rollers 49 positioned on both sides of the discharge driving roller 420 in the width direction X press sections of the medium M on both sides of the discharge driving roller 420 in the width direction X downward such that those sections are lower than the upper end TP. In this way, the medium M is pressed against the outer circumferential surface 420A of the discharge driving roller 420. As a result, the winding amount by which the medium M is wound around the outer circumferential surface 420A of the discharge driving roller 420 increases. Thus, even if the rear end of the medium M is kicked out by the discharge roller pair 41, the frictional force caused by the increased contact area between the medium M and the outer circumferential surface 420A of the discharge driving roller 420 acts as the braking force, and thus, the deterioration in the transport position accuracy of the medium M can be suppressed.

As illustrated in FIG. 17, the plurality of second rollers 49 are basically arranged in the same position as the ribs 54 in the width direction X. In other words, in the embodiment described above, the plurality of second rollers 49 are basically arranged in the same positions as the pressing members 81 in the width direction X. Thus, as well as the sections of the medium M supported from the lower side and forming the ridge portions being positioned in substantially the same positions both upstream and downstream, in the transport direction Y0, on either side of the recording region in which the recording is performed by the recording head 25, the sections of the medium M that are pressed down from above and forming the valley portions are also positioned in substantially the same positions both upstream and downstream of the recording region in the transport direction Y0.

In this way, the upstream ridge portions and valley portions, and the downstream ridge portions and valley portions are formed in the same positions in the width direction X, and thus, the wave-like shape including the ridge portions and the valley portions is easily formed in the medium M.

Note that in the configuration illustrated in FIG. 7, there are locations at which the second rollers 49 are not arranged in the width direction X, in order to avoid a transport member 90A configuring the transport mechanism 90 that transports the tray on which the disk is placed during the label recording. In contrast, in the configuration illustrated in FIG. 17, the second rollers 49 are disposed in positions upstream of the transport members 90A in the transport direction Y0. In the above-described embodiment, the second rollers 49 can also be disposed in the positions corresponding to the ribs 54 in the space for avoiding the transport member 90A. In other words, the number of second rollers 49 having the same positions in the width direction X as the pressing members 81 can be increased. As a result, the locations forming the valley portions in the medium M can be increased, and thus, the wave-like shape can be even more easily formed in the medium M. As a result, it is possible to further suppress the rear end portion of the medium M from floating and coming into contact with the nozzle surface 25A.

Figure 19:
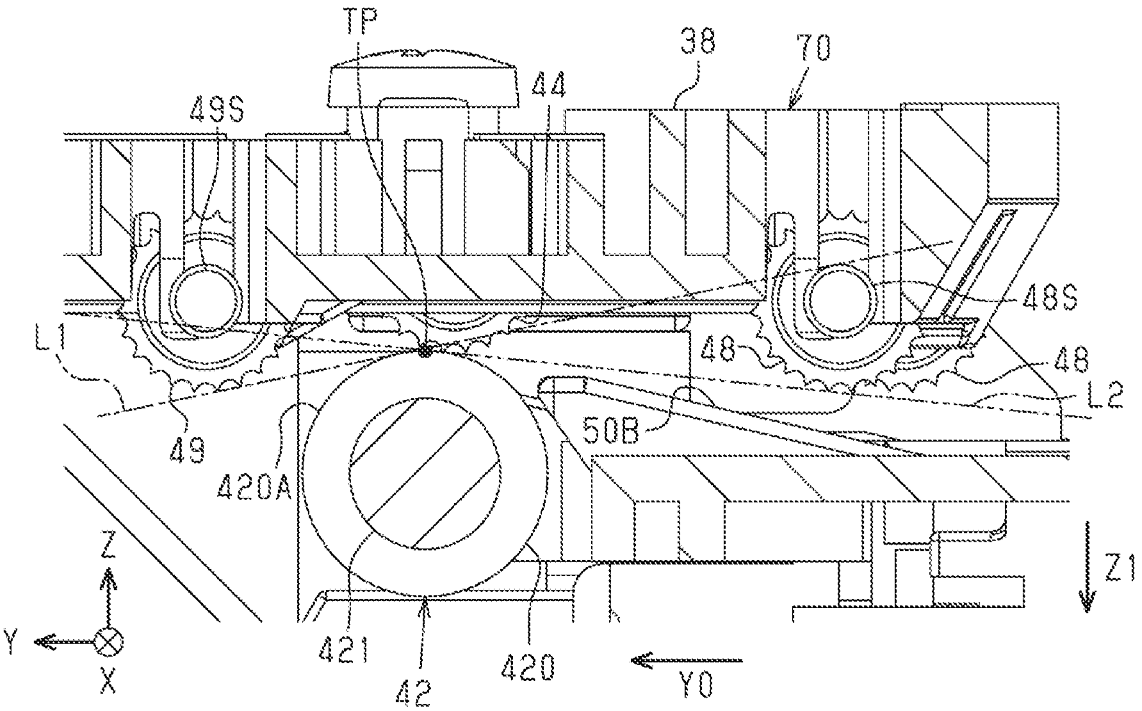
FIG. 19 is a side cross-sectional view illustrating the discharge mechanism of a modified example.

Of the first roller 48 and the second roller 49, which are the examples of the guide roller disposed on both sides of the discharge roller pair 42 in the transport direction Y0, it is sufficient that the lower end of at least one of the first roller 48 and the second roller 49 is positioned lower than the upper end TP of the discharge driving roller 420. For example, the lower end of one of the first roller 48 and the second roller 49 may be positioned higher than the upper end TP of the discharge driving roller 420. For example, in the side view illustrated in FIG. 19, as long as the lower end of the first roller 48 is positioned lower than a tangent line L1 indicated by a one-dot chain line in FIG. 19, the lower end of the first roller 48 may be positioned at the same height as the upper end TP of the discharge driving roller 420 or positioned higher than the upper end TP. Here, the tangent line L1 is a tangent line that passes the lower end of the second roller 49 and touches the outer circumferential surface 420A of the discharge driving roller 420. Further, as illustrated in FIG. 19, as long as the lower end of the second roller 49 is positioned lower than a tangent line L2 indicated by a two-dot chain line in FIG. 19, the lower end of the second roller 49 may be positioned at the same height as the upper end TP of the discharge driving roller 420 or positioned higher than the upper end TP. Here, the tangent line L2 is a tangent line that passes the lower end of the first roller 48 and touches the outer circumferential surface 420A of the discharge driving roller 420. According to these configurations also, it is possible to secure a large winding amount of the medium M on the outer circumferential surface of the discharge driving roller 420. Thus, as a result of the braking force caused by the increase in the contact area between the medium M and the outer circumferential surface 420A of the discharge driving roller 420, a kicking amount of the medium M can be suppressed when the kicking phenomenon occurs. Note that, in contrast to the latter configuration, since the lower end of the first roller 48 is positioned lower than the upper end TP in the former configuration, it is possible to suppress the floating of the medium M that results in the medium M coming into contact with the nozzle surface 25A.

A configuration may be adopted that combines a mechanism in which the first roller 48 and the second roller 49, as the examples of the guide rollers illustrated in FIG. 7 and FIG. 14, are aligned in the width direction X, and a mechanism in which the second rollers 49, as the example of the guide rollers illustrated in FIG. 18, are aligned in the width direction X.

The second distance D2 may be longer than the first distance D1. Further, the second distance D2 may be the same as the first distance D1.

The control unit 100 may be provided so as to be able to move the second roller 49 in the vertical direction Z1 using the power of an actuator, such as an electric motor or the like. For example, when the medium is the first medium M, the second roller 49 is disposed in a first position, and when the medium is the second medium M, the second roller 49 is disposed in a second position lower than the first position. In this case, the medium M may be pressed downward both in the first position and the second position, but a configuration may be adopted in which the first position is a retracted position in which the second roller 49 does not come into contact with the medium M, and the second roller 49 presses the medium M is downward when in the second position.

The first roller 48 need not necessarily be the serrated roller. Further, the second roller 49 need not necessarily be the serrated roller.

The positions of the second rollers 49 may be different from those of the ribs 54 in the width direction X. The positions of the second rollers 49 may be different from those of the pressing members 81 in the width direction X.

The second roller 49 is not limited to being provided in the plurality thereof in the width direction X, and may be one. For example, a configuration may be adopted in which, as an example of the guide roller, the single first roller 48 and the single second roller 49 are disposed on either side of the discharge driving roller 420 in the transport direction Y0.

The pressing members 81 may be provided at positions facing all of the recessed regions 59.

A roller may be provided on the contact portion 815 of the pressing member 81.

The pressing member 81 may be controlled by the control unit 100. For example, by controlling an electric motor, the control unit 100 controls the position of the pressing member 81 between a retracted position and a pressing position.

The pressing member 81 may be fixed such that it is not displaceable. For example, the pressing member 81 may be supported by a frame.

The pressing member 81 need not necessarily be provided.

The recording device 11 is not limited to the serial printer in which the recording unit 23 reciprocates in the scanning direction X, and the recording unit 23 may be a lateral printer that is movable in two directions, namely, the main scanning direction and a secondary scanning direction, or may be a line printer.

The recording device 11 may be a multi-function device with a built-in reading unit.

The medium M is not limited to the sheet, and may be a flexible plastic film, a fabric, a nonwoven fabric, or the like, or may be a laminate.

The recording device 11 is not limited to being the recording device that performs the printing on the medium such as the sheet or the like, and may be a textile printing machine that performs printing on a fabric.

The recording device 11 is not limited to the inkjet method, and may be a wire impact type recording device or a heat-transfer type recording device. In these recording devices also, contact between the medium that has floated up from the supporting surface and the recording head can be reduced.

The recording device is not limited to the printer for printing. For example, the recording device may be a device that manufactures electric wiring patterns on a substrate, which is an example of the medium, by discharging a liquid body formed by dispersing or mixing particles of a functional material into a liquid, or that manufactures pixels of a display of various types such as liquid crystals, electroluminescence (EL), or surface light-emission.

Hereinafter, technical concepts and effects thereof that are understood from the above-described embodiment and modified examples will be described.

(A) A recording device is a recording device including a transport unit that transports a medium along a horizontal direction in a transport direction, a medium supporting member that includes a supporting surface supporting the medium, and a recording head that performs recording on the medium at a position facing the medium supporting member. The transport unit includes a transport roller pair formed of a transport driving roller and a transport driven roller provided upstream of the medium supporting member in the transport direction, a discharge roller pair formed by a discharge driving roller and a discharge driven roller provided downstream of the medium supporting member in the transport direction, and a guide roller provided downstream of the medium supporting member in the transport direction, and on the same upper side as the discharge driven roller with respect to a transport path of the medium, and driven to rotate by contact with the medium during transport. The guide roller is provided on both sides of the discharge roller pair in the transport direction or on both sides of the driven discharge roller in a width direction intersecting the transport direction, and a lower end of at least one of the guide rollers on the both sides is positioned lower than an upper end of the discharge driving roller.

According to this configuration, the lower end of at least one of the plurality of guide rollers is positioned lower than the upper end of the discharge driving roller, and thus the medium is pressed firmly against the outer circumferential surface of the discharge driving roller. As a result, a winding amount of the medium wound around a portion of the outer circumferential surface of the discharge driving roller increases and a contact area with the outer circumferential surface increases, and thus, contact friction resistance with the outer circumferential surface is increased. Thus, even when the rear end of the medium is kicked out at the moment the rear end is released from the transport roller pair, a deterioration in a transport position accuracy of the medium is suppressed by the increased frictional force (braking force) resulting from the section of the medium in contact with the discharge driving roller being pressed against the outer circumferential surface.

(B) The guide roller may be provided on both sides of the discharge roller pair in the transport direction, and the guide roller may be a first roller disposed upstream of the discharge roller pair in the transport direction, and a second roller provided downstream of the discharge roller pair in the transport direction. A lower end of the second roller may be positioned lower than the upper end of the discharge driving roller.

According to this configuration, of the first roller and the second roller positioned on either side of the discharge driving roller in the transport direction, the lower end of the second roller is positioned lower than the upper end of the discharge driving roller, and thus, a section of the medium clamped between the discharge roller pair, is firmly pressed against the outer peripheral surface of the discharge driving roller. Thus, even when the rear end of the medium is kicked out at the moment the rear end is released from the transport roller pair, the deterioration in the transport position accuracy of the medium is suppressed by the increased frictional force (braking force) resulting from the medium being pressed against the outer circumferential surface.

(C) The lower end of the first roller may be positioned lower than the upper end of the discharge driving roller.

According to this configuration, the lower end of the first roller and the lower end of the second roller are both positioned lower than the upper end of the discharge driving roller, and thus, the medium is even more firmly pressed against the outer circumferential surface of the discharge driving roller. Thus, even when the rear end of the medium is kicked out by the transport roller pair, the deterioration in the transport position accuracy of the medium is suppressed by the increased frictional force (braking force) resulting from the medium being pressed against the outer circumferential surface.

(D) A difference in dimensions, in the vertical direction, between the lower end of the first roller and the lower end of the second roller may be no greater than an overlap amount, in the vertical direction, between the second roller and the discharge driving roller.

According to this configuration, since the lower end of the first roller and the lower end of the second roller press the medium firmly against the outer circumferential surface of the discharge driving roller, the necessary winding amount is secured, and, as a result, failures caused by the medium being excessively pressed downward by the first roller and the second roller can be suppressed. For example, if the first roller is positioned too far downward, marks and scratches easily occur on a recording surface of the medium. Further, if the second roller is positioned too far downward, the section of the medium upstream of the discharge roller pair is lifted up, and a possibility of the rear end portion of the medium coming into contact with the recording head increases. In contrast, according to this configuration, it is possible to suppress the occurrence of marks and scratches on the recording surface of the medium, and to suppress the rear end portion of the medium from floating and coming into contact with the recording head. Thus, the deterioration in the transport position accuracy of the medium due to the kicking phenomenon of the medium can be suppressed, and thus, failures caused by the medium being excessively pressed downward by the first roller and the second roller can be suppressed.

(E) A position of the second roller in the width direction may be disposed corresponding to a position between the discharge driven rollers.

According to this configuration, a wave-like shape is formed in the medium such that the section resting on the discharge driving roller is a ridge portion and a section pressed downward by the second roller is a valley portion.

Thus, the rear end portion, which is an upstream end portion of the medium in the transport direction, can be inhibited from floating and coming into contact with the recording head.

(F) Positions of the first roller and the second roller may be the same in the width direction.

According to this configuration, the medium is formed in the wave-like shape such that the section resting on the discharge driving roller is the ridge portion and the sections pressed down by the first roller and the second roller are the valley portions. Thus, the rear end of the medium can be inhibited from floating and coming into contact with the recording head.

(G) The first roller may be urged downward by a first urging force while being upwardly displaceable, and the second roller may be urged downward by a second urging force while being upwardly displaceable. The discharge driven roller may urged downward toward the discharge driving roller by a third urging force while being upwardly displaceable. The first urging force of the first roller and the second urging force of the second roller may be smaller than the third urging force of the discharge driven roller.

According to this configuration, the first urging force of the first roller and the second urging force of the second roller are smaller than the third urging force of the discharge driven roller, and thus, it is possible to suppress generation of an excessive frictional force due to the medium being firmly pressed against the outer circumferential surface of the discharge driving roller. For example, an overlap amount between the first roller, the second roller, and the discharge driving roller changes in accordance with the rigidity of the medium. As a result, it is possible to suppress the medium having the high rigidity from being wound by an excessive amount around the outer circumferential surface of the discharge driving roller. Thus, it is possible to suppress a deterioration in the transport position accuracy of the medium caused by the excessive frictional force between the medium and the discharge roller pair when the medium is transported.

(H) A second distance, in the transport direction, between the second roller and the upper end of the discharge driving roller may be shorter than a first distance, in the transport direction, between the first roller and the upper end of the discharge driving roller.

According to this configuration, it is possible to prevent the second roller from being positioned too far downward. Thus, it is possible to keep small an amount by which an upstream section of the medium, in the transport direction, is lifted up, with the upper end of the discharge driving roller acting as a fulcrum, when the second roller presses the medium. For example, it is possible to suppress the upstream section of the medium from being lifted up and coming into contact with the recording head.

(I) The medium supporting member may alternately include ribs and recessed regions in the width direction, the ribs including the supporting surface supporting the medium and the recessed regions being formed in regions other than the ribs, and a position of the second roller in the width direction may be the same as a position of the recessed region.

According to this configuration, the medium is formed in the wave-like shape in which the section supported by the rib is the ridge portion and the section corresponding to the recessed region and the second roller is the valley portion. Thus, the rear end of the medium can be inhibited from floating and coming into contact with the recording head.

(J) The recording device may include a pressing member configured to press the medium to a position lower than the supporting surface of the medium supporting member, at a position upstream of a recording position of the recording head in the transport direction. A position of the second roller in the width direction may be the same as a position of the pressing member.

According to this configuration, the medium is formed in the wave-like shape in which the ridge portions and the valley portions are repeated in the width direction X, such that the sections of the medium supported by the support surface and the discharge driving roller are the ridge portions, and the sections of the medium pressed by the pressing member and the second roller are the valley portions. As a result, the rigidity of the medium is increased, and thus, it is possible to inhibit a tip portion of the medium from floating and coming into contact with the recording head, and to inhibit the rear end portion of the medium from floating and coming into contact with the recording head.

(K) the guide roller may be provided on both sides of the discharge driving roller in the width direction, and a lower end of the guide roller may be positioned lower than an upper end of the discharge driving roller.

According to this configuration, the medium is pressed against the outer circumferential surface of the discharge driving roller by the guide rollers positioned on both sides of the discharge driving roller in the width direction. Thus, even when the rear end of the medium is kicked out from the transport roller pair, the deterioration in the transport position accuracy of the medium can be suppressed by the frictional force (the braking force) resulting from the medium being pressed against the outer circumferential surface.

What is claimed is:

1. A recording device comprising:

a transport unit that transports a medium along a horizontal direction in a transport direction;

a medium supporting member that includes a supporting surface supporting the medium; and a recording head that performs recording on the medium at a position facing the medium supporting member, wherein the transport unit includes:

a transport roller pair formed of a transport driving roller and a transport driven roller provided upstream of the medium supporting member in the transport direction, a discharge roller pair formed of a discharge driving roller and a discharge driven roller provided downstream of the medium supporting member in the transport direction, and guide rollers provided downstream of the medium supporting member in the transport direction, and on the same upper side as the discharge driven roller with respect to a transport path of the medium, and driven to rotate by contact with the medium during transport, the guide rollers are provided on both sides of the discharge roller pair in the transport direction, at least one of the guide rollers is a first roller disposed upstream of the discharge roller pair in the transport direction, and at least one of the guide rollers is a second roller provided downstream of the discharge roller pair in the transport direction, and a lower end of the second roller is positioned lower than the upper end of the discharge driving roller, wherein a lower end of the first roller is positioned lower than the upper end of the discharge driving roller, wherein positions of the first roller and the second roller are the same in the width direction.

2. The recording device according to claim 1,
wherein a difference between a first overlap amount, in a vertical direction, between the second roller and the discharge driving roller and a second overlap amount, in the vertical direction, between the first roller and the discharge driving roller is no greater than the first overlap amount.

3. The recording device according to claim 1, wherein
the second roller is disposed in a position corresponding, in the width direction, to a position between the discharge roller pair and an adjacent discharge roller pair.

4. The recording device according to claim 1, wherein
the medium supporting member alternately includes ribs and recessed regions in the width direction, the ribs including the supporting surface supporting the medium and the recessed regions being formed in regions other than the ribs, and
a position of the second roller in the width direction is the same as a position of the recessed regions.

5. The recording device according to claim 1, comprising:
a pressing member configured to press the medium to a position lower than the supporting surface of the medium supporting member, at a position upstream of a recording position of the recording head in the transport direction, wherein
the second roller is disposed at a position that is the same, in the width direction, as a position of the pressing member.

6. The recording device according to claim 1, wherein
the guide rollers are also provided on both sides of the discharge driving roller in the width direction, and
a lower end of at least one of the guide rollers positioned on both sides of the discharge driving roller in the width direction is positioned lower than an upper end of the discharge driving roller.

7. A recording device comprising:
a transport unit that transports a medium along a horizontal direction in a transport direction;
a medium supporting member that includes a supporting surface supporting the medium; and
a recording head that performs recording on the medium at a position facing the medium supporting member,
wherein the transport unit includes:
a transport roller pair formed of a transport driving roller and a transport driven roller provided upstream of the medium supporting member in the transport direction,
a discharge roller pair formed of a discharge driving roller and a discharge driven roller provided downstream of the medium supporting member in the transport direction, and
guide rollers provided downstream of the medium supporting member in the transport direction, and on the same upper side as the discharge driven roller with respect to a transport path of the medium, and driven to rotate by contact with the medium during transport,
the guide rollers are provided on both sides of the discharge roller pair in the transport direction,
at least one of the guide rollers is a first roller disposed upstream of the discharge roller pair in the transport direction, and at least one of the guide rollers is a second roller provided downstream of the discharge roller pair in the transport direction, and
a lower end of the second roller is positioned lower than the upper end of the discharge driving roller, wherein
the first roller is urged downward by a first urging force while being upwardly displaceable, and the second roller is urged downward by a second urging force while being upwardly displaceable,
the discharge driven roller is urged downward toward the discharge driving roller by a third urging force while being upwardly displaceable, and
the first urging force of the first roller and the second urging force of the second roller are smaller than the third urging force of the discharge driven roller.

8. A recording device comprising:
a transport unit that transports a medium along a horizontal direction in a transport direction;
a medium supporting member that includes a supporting surface supporting the medium; and
a recording head that performs recording on the medium at a position facing the medium supporting member,
wherein the transport unit includes:
a transport roller pair formed of a transport driving roller and a transport driven roller provided upstream of the medium supporting member in the transport direction,
a discharge roller pair formed of a discharge driving roller and a discharge driven roller provided downstream of the medium supporting member in the transport direction. and
guide rollers provided downstream of the medium supporting member in the transport direction, and on the same upper side as the discharge driven roller with respect to a transport path of the medium, and driven to rotate by contact with the medium during transport,
the guide rollers are provided on both sides of the discharge roller pair in the transport direction,
at least one of the guide rollers is a first roller disposed upstream of the discharge roller pair in the transport direction, and at least one of the guide rollers is a second roller provided downstream of the discharge roller pair in the transport direction, and
a lower end of the second roller is positioned lower than the upper end of the discharge driving roller, wherein
a second distance, in the transport direction, between the second roller and the upper end of the discharge driving roller is shorter than a first distance, in the transport direction, between the first roller and the upper end of the discharge driving roller.

* * * * *